(12) United States Patent
Citerin et al.

(10) Patent No.: US 11,943,541 B2
(45) Date of Patent: Mar. 26, 2024

(54) METHOD AND SYSTEM FOR AUTO-SETTING OF CAMERAS

(71) Applicant: CANON KABUSHIKI KAISHA, Tokyo (JP)

(72) Inventors: Johann Citerin, Betton (FR); Gérald Kergourlay, Chevaigne (FR); Pierre Visa, Rennes (FR); Falk Tannhauser, Rennes (FR); Romain Bellessort, Rennes (FR); Tristan Halna Du Fretay, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 17/668,252

(22) Filed: Feb. 9, 2022

(65) Prior Publication Data
US 2022/0272247 A1 Aug. 25, 2022

Related U.S. Application Data

(63) Continuation of application No. 16/627,998, filed as application No. PCT/EP2018/067856 on Jul. 2, 2018, now Pat. No. 11,284,012.

(30) Foreign Application Priority Data

Jul. 3, 2017 (GB) .................................. 1710675
Jan. 23, 2018 (GB) .................................. 1801110
Jan. 23, 2018 (GB) .................................. 1801112

(51) Int. Cl.
*H04N 23/73* (2023.01)
*H04N 17/00* (2006.01)
(Continued)

(52) U.S. Cl.
CPC .......... *H04N 23/73* (2023.01); *H04N 17/002* (2013.01); *H04N 23/64* (2023.01); *H04N 23/67* (2023.01)

(58) Field of Classification Search
CPC ...... H04N 23/73; H04N 17/002; H04N 23/64; H04N 23/67; H04N 23/60; H04N 23/70;
(Continued)

(56) References Cited

U.S. PATENT DOCUMENTS 5,751,844 A 5/1998 Bolin et al.
6,301,440 B1 * 10/2001 Bolle ................... G06V 10/147
396/128

(Continued)

FOREIGN PATENT DOCUMENTS

EP 3574644 A1 12/2019

*Primary Examiner* — Abdelaaziz Tissire
(74) *Attorney, Agent, or Firm* — Canon U.S.A., Inc. IP Division

(57) ABSTRACT

At least one embodiment of a method for setting camera parameters of a camera, the method comprising:
obtaining a first set of image characteristic values of images captured by the camera at a first lighting condition, the image characteristics being dependent on the camera parameters, at least two image characteristic values of the first set respectively corresponding to at least two different values of a same camera parameter;
determining at least one second set of image characteristic values by adapting values of the obtained first set of image characteristic values from images captured by the camera at at least one second lighting condition, at least two image characteristic values of the second set respectively corresponding to at least two different values of a same camera parameter;
selecting camera parameter values, based on the determined at least one second set of image characteristics; and
modifying settings of the camera as a function of the selected values.

11 Claims, 12 Drawing Sheets

(51) Int. Cl.
*H04N 23/60* (2023.01)
*H04N 23/67* (2023.01)

(58) Field of Classification Search
CPC .... H04N 23/90; G06V 10/764; G06V 10/993; G06V 10/50; G06V 10/25; G06V 10/771; G06V 10/82; G06V 20/38; G06V 10/10; G06V 20/00; G06V 2201/10; G06V 40/172; G06V 40/174
See application file for complete search history.

(56) References Cited

U.S. PATENT DOCUMENTS

| | | | | |
|---|---|---|---|---|
| 7,822,327 B2* | 10/2010 | Chien | .................... | H04N 23/60 396/125 |
| 8,305,452 B2* | 11/2012 | Fredlund | ............... | H04N 23/633 348/207.1 |
| 10,616,478 B2* | 4/2020 | Jung | .................... | H04N 23/635 |
| 2005/0030387 A1* | 2/2005 | Pilu | ........................ | G03B 17/38 348/222.1 |
| 2005/0286802 A1* | 12/2005 | Clark | ..................... | H04N 17/00 348/E5.042 |
| 2006/0082672 A1* | 4/2006 | Peleg | ..................... | H04N 23/951 348/333.01 |
| 2008/0050111 A1* | 2/2008 | Lee | ........................ | G03B 19/00 396/429 |
| 2009/0202157 A1* | 8/2009 | Zhang | ..................... | H04N 5/77 348/231.2 |
| 2016/0112630 A1* | 4/2016 | Kanumuri | ............ | H04N 23/743 348/222.1 |
| 2018/0124299 A1* | 5/2018 | Brook | .................. | H04N 23/661 |
| 2020/0077017 A1* | 3/2020 | Ji | ........................ | G06V 10/993 |

* cited by examiner

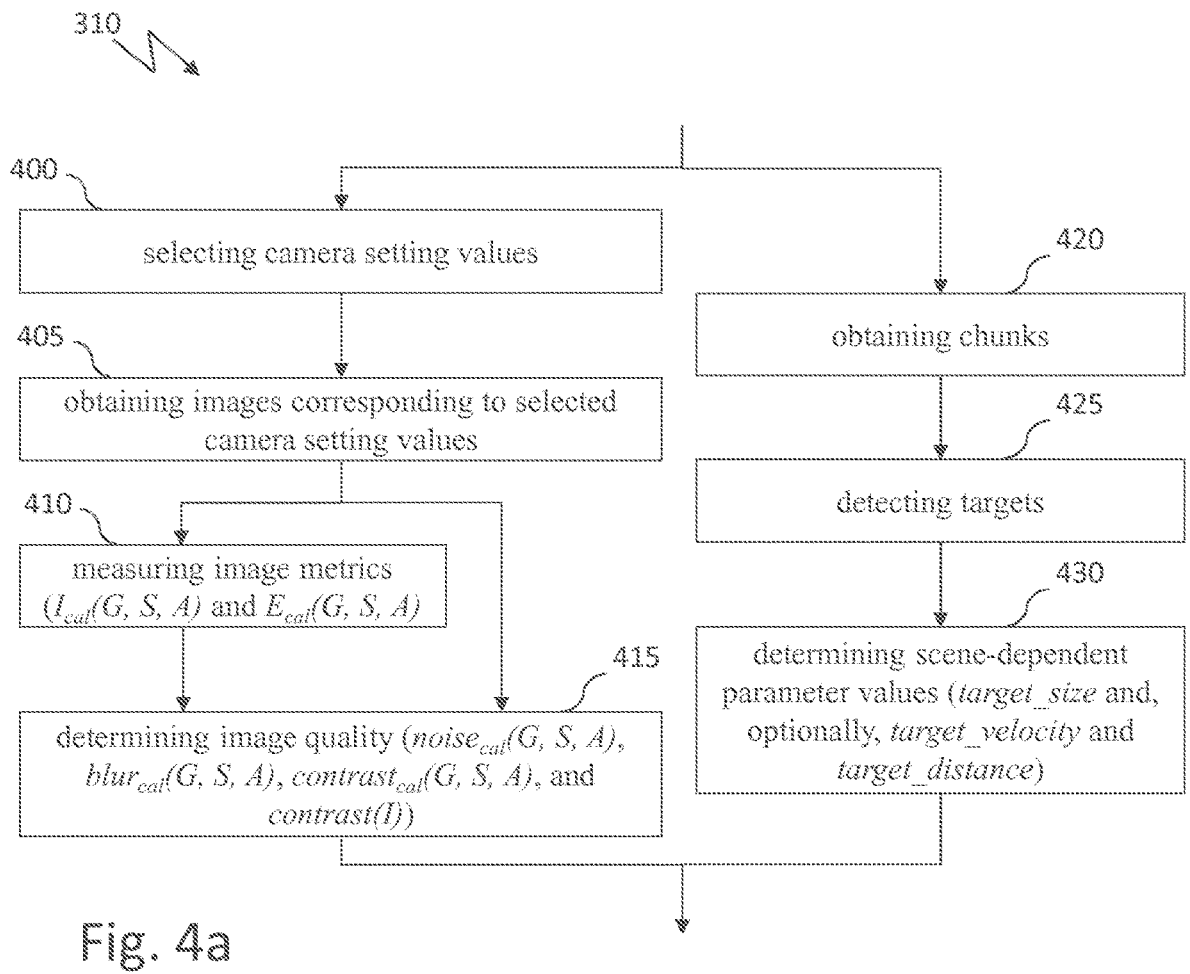

| | $A_n$ | $S_0$ | $S_1$ | | $S_n$ | |
|---|---|---|---|---|---|---|
| | $A_1$ | $S_0$ | $S_1$ | | $S_n$ | $A_n)$ |
| $A_0$ | | $S_0$ | $S_1$ | | $S_n$ | $A_n)$ |
| $G_0$ | $contrast_{current}(G_0, S_0, A_0)$ | $contrast_{current}(G_0, S_1, A_0)$ | | $contrast_{current}(G_0, S_n, A_0)$ | | |
| $G_1$ | $contrast_{current}(G_1, S_0, A_0)$ | $contrast_{current}(G_1, S_1, A_0)$ | | $contrast_{current}(G_1, S_n, A_0)$ | | $A_n)$ |
| | | | | | | |
| $G_n$ | $contrast_{current}(G_n, S_0, A_0)$ | $contrast_{current}(G_n, S_1, A_0)$ | | $contrast_{current}(G_n, S_n, A_0)$ | | |

Fig.11

| | $A_n$ | $S_0$ | $S_1$ | | $S_n$ | |
|---|---|---|---|---|---|---|
| | $A_1$ | $S_0$ | $S_1$ | | $S_n$ | $A_n)$ |
| $A_0$ | | $S_0$ | $S_1$ | | $S_n$ | $A_n)$ |
| $G_0$ | $score_{current}(G_0, S_0, A_0)$ | $score_{current}(G_0, S_1, A_0)$ | | $score_{current}(G_0, S_n, A_0)$ | | |
| $G_1$ | $score_{current}(G_1, S_0, A_0)$ | $score_{current}(G_1, S_1, A_0)$ | | $score_{current}(G_1, S_n, A_0)$ | | $A_n)$ |
| | | | | | | |
| $G_n$ | $score_{current}(G_n, S_0, A_0)$ | $score_{current}(G_n, S_1, A_0)$ | | $score_{current}(G_n, S_n, A_0)$ | | |

Fig.12

METHOD AND SYSTEM FOR AUTO-SETTING OF CAMERAS

CROSS REFERENCE TO RELATED APPLICATION

This application is a continuation of U.S. patent application Ser. No. 16/627,998, presently pending and filed on Dec. 31, 2019, which is a National Phase application of PCT Application No. PCT/EP2018/067856, filed on Jul. 2, 2018. This application claims the benefit under 35 U.S.C. § 119(a)-(d) of United Kingdom Patent Application No. 1710675.8, filed on Jul. 3, 2017 and entitled "method and system for auto-setting cameras", of United Kingdom Patent Application No. 1801112.2, filed on Jan. 23, 2018 and entitled "method and system for improving auto-setting of cameras", and of United Kingdom Patent Application No. 1801110.6, filed on Jan. 23, 2018 and entitled "method and system for updating auto-setting of cameras". The above cited patent applications are incorporated herein by reference in its entirety.

FIELD OF THE INVENTION

The present invention relates to the technical field of camera setting and to a method and a system for auto-setting cameras, for example auto-setting cameras within video surveillance systems.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour, or general data gathering.

The ever-increasing use of network cameras for such purposes has led in particular to increasing image quality, especially to improving image resolution, contrast, and colour.

However, it has been observed that image quality improvement is slowing recently. Indeed, while the camera sensors embedded in recent cameras may provide high quality outputs, image quality highly depends on camera settings that are often not optimal. Motion blur, bad exposure, and a wrong choice of network settings lead very often to poor images.

Moreover, it is noted that environmental conditions may change significantly over a few hours. For example, day versus night, rain versus sun, and light intensity changes are typical environmental changes that have a huge impact on image quality and resource consumption. Therefore, using only one fixed camera setting leads to very poor image quality on average.

To address such changes of environmental conditions, there exist in-camera auto-setting methods such as auto-focus and auto-exposure for adapting camera settings dynamically. Such an auto-setting capability may be further improved thanks to additional manual settings and profiles, making it possible to adapt the auto-setting to the particular camera environment and to choose a suitable trade-off, e.g. a suitable trade-off between image quality and network consumption.

Below, the in-camera embedded auto-setting is referred to as the "camera auto-mode" or the "auto-mode".

Although the camera auto-mode makes it possible to improve image quality by adapting camera settings dynamically, the settings may still need to be improved. In particular, the camera auto-mode is not so reliable for the following reasons:

fine-tuning camera settings to improve the quality of the auto-mode is time-consuming and requires particular skills and a good knowledge of the camera's capabilities and settings interface;

most camera installers do not modify the settings and keep with the default factory auto-mode;

some issues such as motion blur are not solvable through auto-setting;

very few (if any) camera auto-modes are dedicated to optimizing the image in a region of interest (ROI), which leads to bad exposure issues and suboptimal quality; and the camera auto-mode is not adapted to specific tasks or missions, which do not necessarily have the same constraints as the mainstream usage that the camera auto-mode is suited for.

Moreover, it is noted that the quality of images obtained from network cameras as well as deployment ease and cost of the latter would benefit from a more effective auto-setting. This would make it possible for non-specialists, e.g. by the customer's staff itself, to install cameras and this should be efficient in any situation.

It is to be recalled that the three main physical settings that are used to control the quality of images obtained from a camera, in terms of contrast, brightness, sharpness (or blur), and noise level are the aperture, the gain, and the shutter speed (corresponding to the exposure time, generally expressed in seconds).

Generally, the camera auto-mode determines values for the aperture, the gain, and the shutter speed as a function of contrast and global exposure analysis criteria. Many combinations of aperture, gain, and shutter speed values lead to the same contrasts. Indeed, increasing the aperture value, the gain value, and/or increasing the shutter speed value (i.e. increasing exposure time) results in a brighter image. However, increasing the aperture value, the gain value, and/or the shutter speed value does not result only in a brighter image but also affects depth-of-field, noise, and motion blur:

increasing the aperture value means increasing the amount of light that reaches the sensor, which results in a brighter image but also in an image having a smaller depth-of-field (which increases the defocus blur);

increasing the gain value means increasing the dynamic of the image, which results in a brighter image but also in an image having more noise; and increasing the shutter speed value (i.e. increasing the exposure time) means increasing the amount of light that reaches the sensor, which results in a brighter image, but also increasing the motion blur.

Accordingly, a trade-off should be reached between the aperture, gain, and shutter speed values so as to maximize the contrast while minimizing noise and blur (defocus blur and motion blur).

Consequently, there is a need to improve auto-setting of cameras, in particular for dynamically configuring cameras of video-surveillance systems, without disrupting the system while it is running.

SUMMARY OF THE INVENTION

The present invention has been devised to address one or more of the foregoing concerns.

In this context, there is provided a solution for auto-setting cameras, for example for auto-setting cameras in video surveillance systems.

According to a first aspect of the invention, there is provided a method for setting camera parameters of a camera, the method comprising:

obtaining a first set of image characteristic values of images captured by the camera at a first lighting condition, the image characteristics being dependent on the camera parameters, at least two image characteristic values of the first set respectively corresponding to at least two different values of a same camera parameter;

determining at least one second set of image characteristic values by adapting values of the obtained first set of image characteristic values from images captured by the camera at at least one second lighting condition, at least two image characteristic values of the second set corresponding respectively to at least two different values of a same camera parameter;

selecting camera parameter values for the camera, based on the determined at least one second set of image characteristics; and modifying settings of the camera as a function of the selected camera parameter values, the camera parameters comprising aperture, gain, and/or shutter speed.

According to the method of the invention, selecting camera parameter values of a camera is rapid, efficient and minimally-invasive for the camera (i.e. the camera does not freeze during the auto-setting and remains operational).

Optional features of the invention are further defined in the dependent appended claims.

According to a second aspect of the invention, there is provided a device for setting camera parameters of a camera, the device comprising a microprocessor configured for carrying out the steps of obtaining a first set of image characteristic values of images captured by the camera at a first lighting condition, the image characteristics being dependent on the camera parameters, at least two image characteristic values of the first set respectively corresponding to at least two different values of a same camera parameter;

determining at least one second set of image characteristic values by adapting values of the obtained first set of image characteristic values from images captured by the camera at at least one second lighting condition, at least two image characteristic values of the second set corresponding respectively to at least two different values of a same camera parameter;

selecting camera parameter values for the camera, based on the determined at least one second set of image characteristics; and modifying settings of the camera as a function of the selected camera parameter values, the camera parameters comprising aperture, gain, and/or shutter speed.

The second aspect of the present invention has optional features and advantages similar to the first above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIG. 4a is a block diagram illustrating a first example of steps carried out during a calibration phase of an auto-setting method as illustrated in FIG. 3;

FIG. 4b is a block diagram illustrating an example of steps carried out for building a distance map of moving targets from a region of interest, a focus value, and images;

FIG. 11 is a table illustrating relationships between the contrast and the gain, the shutter speed, and the aperture in accordance with an aspect of the present disclosure.

FIG. 12 is a table illustrating relationships between the score and the gain, the shutter speed, and the aperture in accordance with an aspect of the present disclosure.

DETAILED DESCRIPTION OF EMBODIMENTS OF THE INVENTION

According to embodiments, a new auto-setting method is provided. It comprises several phases among which a learning phase and a calibration phase for obtaining information and an operation phase for dynamically auto-setting a camera in any situation, when environmental conditions change. A new calibration phase may be triggered when environmental conditions change significantly and when items of information obtained during previous calibration phases are no longer efficient.

It has been observed that since most network cameras monitor distant targets, the aperture value is generally set so that focus is achieved for any objects positioned more than about one meter from the cameras. As a result, the trade-off to be attained is generally mainly directed to gain and shutter speed that is to say to noise and motion blur. However, the inventors have observed that there exist circumstances in which optimizing the aperture value has a significant impact on the overall system efficiency. Therefore, depending on the use of the network cameras, the trade-off to be attained may be directed to gain and shutter speed or to gain, shutter speed, and aperture.

Figure 1:
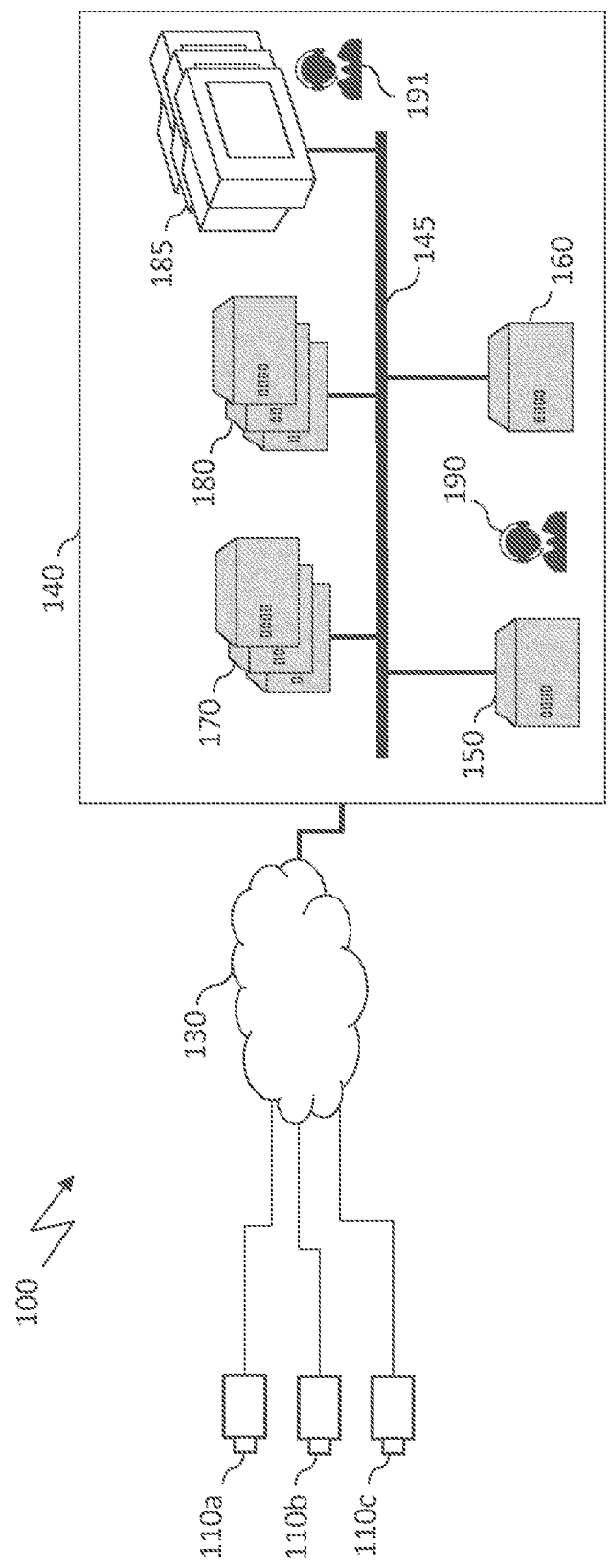
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network cameras denoted 110a, 110b, and 110c, for example network cameras of the Internet Protocol (IP) type, generically referred to as IP cameras 110.

Network cameras 110, also referred to as source devices, are connected to a central site 140 via a backbone network 130. In a large video surveillance system, backbone network 130 is typically a wide area network (WAN) such as the Internet.

According to the illustrated example, central site 140 comprises a video manager system (VMS) 150 used to manage the video surveillance system, an auto-setting server 160 used to perform an automatic setting of cameras 110, and a set of recording servers 170 configured to store the received video streams, a set of video content analytics (VCA) servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

Video manager system 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. In particular, administrator 190 may use video manager system 150 to select a source encoder configuration for each source device of the video surveillance system. In the state of the art, it is the only means to configure the source video encoders.

The set of displays 185 may be used by operators (e.g. operators 191) to watch the video streams corresponding to the scenes shot by the cameras of the video surveillance system.

The auto-setting server 160 contains a module for setting automatically or almost automatically parameters of cameras 110. It is described in more detail by reference to FIG. 2.

Administrator 190 may use the administration interface of video manager system 150 to set input parameters of the auto-setting algorithm described with reference to FIGS. 3 to 7, carried out in in auto-setting server 160.

Figure 2:
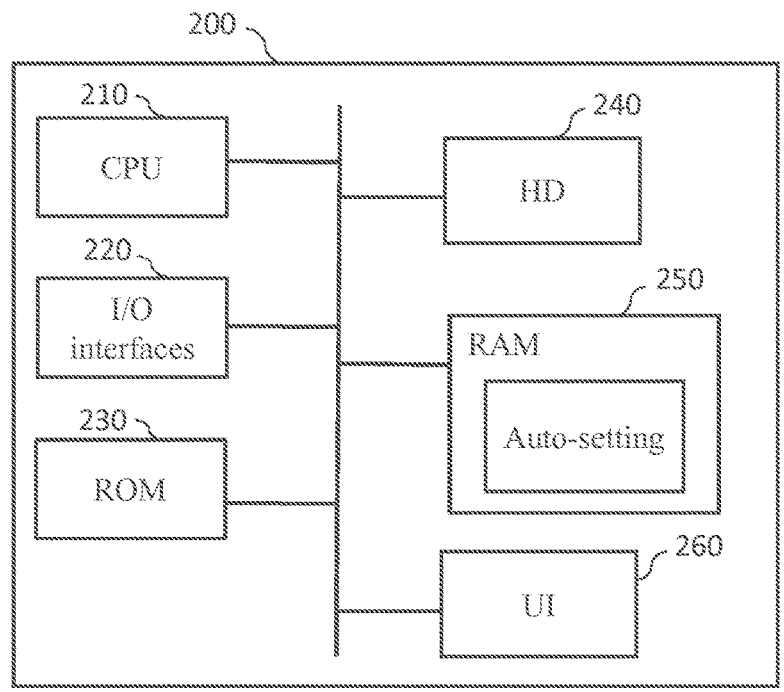
FIG. 2 is a schematic block diagram of a computing device for implementing embodiments of the invention.

FIG. 2 is a schematic block diagram of a computing device for implementing embodiments of the invention. It may be embedded in auto-setting server 160 described with reference to FIG. 1.

The computing device 200 comprises a communication bus connected to:
- a central processing unit 210, such as a microprocessor, denoted CPU;
- an I/O module 220 for receiving data from and sending data to external devices. In particular, it may be used to retrieve images from source devices;
- a read only memory 230, denoted ROM, for storing computer programs for implementing embodiments;
- a hard disk 240 denoted HD;
- a random access memory 250, denoted RAM, for storing the executable code of the method of embodiments of the invention, in particular an auto-setting algorithm, as well as registers adapted to record variables and parameters;
- a user interface 260, denoted UI, used to configure input parameters of embodiments of the invention. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

Figure 3:
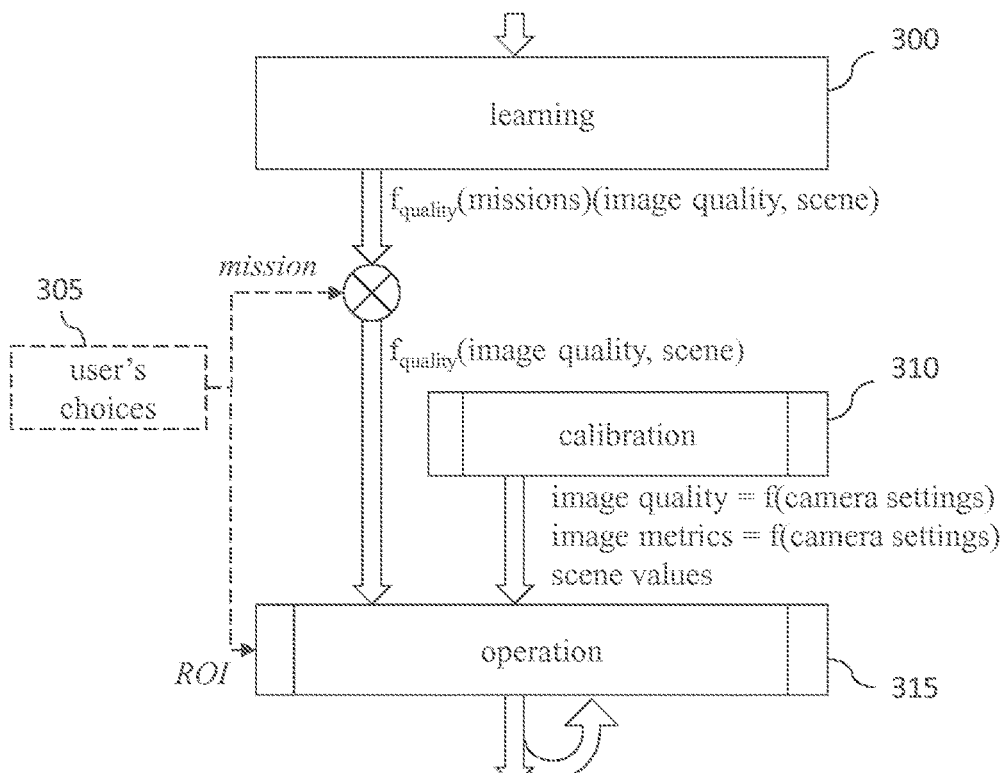
FIG. 3 is a block diagram illustrating an example of an auto-setting method making it possible to set automatically parameters of a source device according to embodiments of the invention.

FIG. 3 is a block diagram illustrating an example of an auto-setting method making it possible to set automatically parameters of a source device, typically a camera, according to embodiments of the invention.

As illustrated, a first phase is a learning phase (reference 300). According to embodiments, it is performed before the installation of the considered camera, for example during the development of a software application for processing images. Preferably, the learning phase is not specific to a type of camera (i.e. it is advantageously generic). During this phase, a relation or a function is established between a quality value (relating to the result of the image processing) and all or most of the relevant variables that are needed to estimate such a processing result quality. These relevant variables may include image quality-dependent parameters and/or scene-dependent parameters. As described hereafter, this relation or function, denoted quality function, may depend on a type of the missions that can be handled by any camera.

An objective of the learning phase is to obtain a quality function which is able to state prima facie the quality of an image in the context of a particular mission, as a function of parameters which have an impact on the mission.

According to particular embodiments, the output of the learning phase is a quality function that may be expressed as follows:

$$f_{quality}(\text{missions})(\text{image quality}, \text{scene})$$

where,
    missions is a type of mission;
    image quality is a set of parameters that may comprise a blur value, a noise value, and a contrast value; and
    scene is a set of parameters that may comprise a target size, a target velocity, and/or a target distance.

Therefore, in particular embodiments, the output of the learning phase may be expressed as follows:

$$f_{quality}(missions)(noise, blur, contrast, target\_size, target\_velocity, target\_distance)$$

The quality function $f_{quality}$ may be a mathematical relation or an n-dimensional array associating a quality value with a set of n parameter values, e.g. values of noise, blur, contrast, target size, target velocity, and target distance.

As denoted with reference 305, the type of mission to be handled by the camera may be chosen by a user (or an installer) during installation of the camera or later on. Likewise, a user may select a region of interest (ROI) corresponding to a portion of an image to be processed. As illustrated with the use of dotted lines, this step is optional.

As illustrated, after a user has selected a type of mission, the quality function obtained from the learning phase may be written as follows:

$$f_{quality}(image\ quality, scene)$$

or, according to the given example:

$$f_{quality}(noise, blur, contrast, target\_size, target\_velocity, target\_distance)$$

Alternatively, the auto-setting algorithm may be configured for a particular type of mission and the whole captured scene may be considered.

It is observed here that there exist two sources of blur, the motion blur and the focus blur.

A second phase (reference 310) is directed to calibration. This is typically carried out during installation of the camera and aims at measuring scene values from the actual scene according to the settings of the camera, as well as at obtaining parameter values depending on the camera settings. This may take from a few minutes to a few tens of minutes. As explained hereafter, in particular with reference to FIGS. 4 and 7, it makes it possible to determine quality processing values according to the actual scene and the current camera settings. According to embodiments, the calibration phase is run only once.

The outputs of this phase may comprise: scene values (for example target size, target velocity, and target distance); image quality values (for example noise, blur, and contrast) that may be determined as a function of the camera settings (for example gain, shutter speed, and aperture); and image metrics (for example luminance) that may be determined as a function of the camera settings (for example gain, shutter speed, and aperture). They can be expressed as follows:

scene-related parameters:
    target_size
    target_speed
    target_distance
image quality:
    noise = $f_{noise\_calibration}$(gain, shutter speed, aperture)
    blur = $f_{blur\_calibration}$(gain, shutter speed, aperture)
    contrast = $f_{contrast\_calibration}$(gain, shutter speed, aperture)
image metrics:
    luminance = $f_{luminance\_calibration}$(gain, shutter speed, aperture)

The functions ($f_{noise\_calibration}$, $f_{blur\_calibration}$, $f_{contrast\_calibration}$, $f_{luminance\_calibration}$) may be mathematical relations or 3-dimensional arrays associating values with sets of 3 parameter values (gain, shutter speed, and aperture). Alternatively, the functions ($f_{noise\_calibration}$, $f_{blur\_calibration}$, $f_{contrast\_calibration}$, $f_{luminance\_calibration}$) may be mathematical relations or 3-dimensional arrays associating values with sets of 2 parameter values (gain and shutter speed).

A third phase (reference 315) is directed to operation. It is performed during the operational use of the camera to improve its settings. It is preferably executed in a very short period of time, for example less than one second, and without perturbation for the camera, except for changing camera settings (i.e. it is a non-invasive phase). It is used to select suitable camera settings, preferably the most suitable camera settings.

To that end, data obtained during the calibration phase are used to calculate good settings, preferably the best settings, according to the quality function determined during the learning phase, in view of the current environmental conditions. Indeed, the environmental conditions, typically lighting, may be different from the environmental conditions corresponding to the calibration. Accordingly, the calibration data must be adjusted to fit the current environmental conditions. Next, the adjusted data are used to calculate the best settings. This may be an iterative process since the adjustments of the calibration data are more accurate when camera settings get closer to the optimal settings. Such an operation phase is preferably carried out each time a new change of camera settings is needed.

The output of the operation phase is a camera setting, for example a set of gain, shutter speed, and aperture values.

During the operation phase a test may be performed to determine whether or not the items of information determined during the calibration phase make it possible to obtain accurate results. If the items of information determined during the calibration phase do not make it possible to obtain accurate results, some steps of the calibration phase may be carried out again, as discussed with reference to FIG. 6c.

Learning Phase

Video surveillance cameras can be used in quite different contexts that is to say to conduct different "missions" or "tasks". For example, some cameras may be used to provide an overall view, making it possible to analyse wide areas, for example for crowd management or detection of intruders, while others may be used to provide detailed views, making it possible, for example to recognize faces or license plates and others may be used to control the proper functioning of machinery, for example in factories. Depending on the type of mission, the constraints associated with the camera may be quite different. In particular, the impact of the noise, blur, and/or contrast is not the same depending on the mission. For example, the blur has generally a high impact on missions for which details are of importance, e.g. for face or license plate readability. In other cases, the noise may have more impact, for example when scenes are monitored continuously by humans (due to the higher eye strain experienced on noisy videos).

As set forth above, an objective of the learning phase is to get a quality function which is able to state prima facie the quality of an image in the context of a particular type of missions, as a function of parameters which have an impact on the missions.

According to embodiments, such parameters may be the followings:
    the parameters which represent a quality of images provided by the camera, which depend on the camera settings. Such parameters may comprise the noise, the blur, and/or the contrast; and the parameters that are directed to the scene and the mission to be performed, referred to as scene-dependent parameters hereafter, their values being referred to as scene values. Their number and their nature depend on the type of missions. These parameters may comprise a size of targets, and/or a velocity of the targets, and/or a distance of the targets from the camera. The values of these parameters may be predetermined, may be determined by a user, or may be estimated, for example by image analysis. They do not have a direct impact on the image quality but play a role in how difficult it is to fulfil a mission. For example, the noise has more impact on smaller targets than on larger targets so the perceived quality of noisy images will be worse when targets are smaller.

Regarding the image quality, it has been observed that the noise, the blur, and the contrast are generally the most relevant parameters. Nevertheless, camera settings have an impact on other parameters that may be considered as representative of the image quality, for example on the depth-of-field and/or on or the white balance. However, it is observed that for particular applications, due to hyperfocal settings in video surveillance systems, the depth of field may be not very relevant. It is also to be noted that the white balance is generally efficiently handled by the camera auto-mode. Accordingly and for the sake of clarity, the following description is based on the noise, the blur, and the contrast as image quality parameters. However, it must be understood that other parameters may be used.

Regarding the scene-dependent parameters, it has been observed that the target size, the target velocity, and the target distance are generally the most relevant parameters. Therefore, for the sake of clarity, although other parameters may be used, the following description is based on these three parameters.

Accordingly, the quality function determined in the learning phase may generally be expressed as follows:

$$f_{quality}(\text{missions})(\text{noise,blur,contrast,target\_size,target\_velocity,target\_distance})$$

or as a set of functions (one function per type of mission denoted mission<i>):

$$f_{quality}(\text{noise,blur,contrast,target\_size,target\_velocity,target\_distance}) \text{ for mission}<i>$$

or as a function corresponding to a predetermined type of mission for which a video surveillance system is to be used:

$$f_{quality}(\text{noise,blur,contrast,target\_size,target\_velocity,target\_distance})$$

Such a function makes it possible, during the operation phase, to select efficient camera settings for the mission to be carried out, in view of the noise, blur, contrast, target velocity, and target size corresponding to the current camera settings (according to the results obtained during the calibration phase).

For the sake of illustration, this function may be scaled between 0 (very low quality) and 1 (very high quality).

According to embodiments, the quality function is set by an expert who determines how to penalize the noise, blur, and contrast for a considered type of mission.

For the sake of illustration, the quality function may be the following:

$$f_{quality} = 3 \frac{V_{noise} \times V_{blur} \times V_{contrast}}{V_{noise} + V_{blur} + V_{contrast}}$$

where $V_{noise}$, $V_{blur}$, and $V_{contrast}$ represent values for the noise, blur, and contrast parameters, respectively.

As described above, the blur comprises a motion blur component and a focus blur component. Therefore, the blur may be expressed as follows:

$$\text{blur} = \text{blur}_A + \text{blur}_S$$

where $\text{blur}_A$ represents the value of the focus blur and $\text{blur}_S$ represents the value of the motion blur.

The quality function $f_{quality}$ makes it possible to determine a quality value as a function of general image characteristics such as the noise, blur, and contrast, and of scene characteristics such as target size, for a particular mission. However, this function cannot be used directly since it is not possible to determine a priori the noise, blur, and contrast since these parameters cannot be set on a camera.

Calibration Phase

The objective of the calibration phase is to measure in-situ, on the actual camera and the actual scene, all the data that are required to calculate a quality value from an $f_{quality}$ function as determined during the learning phase.

Accordingly, the calibration phase comprises four objectives (or only three if the focus is not to be set):

determining or measuring the scene-dependent parameters, for example a target size, a target velocity, and a target distance;

setting a focus;

estimating functions to establish a link between each of the image quality parameters (for example the noise, blur, and contrast) and the camera settings (for example the gain (G), the shutter speed (S), and the aperture (A)) as follows:

$$\text{noise} = f_{noise\_calibration}(G,S,A), \text{ in short noise}_{cal}(G,S,A)$$

$$\text{blur} = f_{blur\_calibration}(G,S,A), \text{ in short blur}_{cal}(G,S,A)$$

$$\text{contrast} = f_{contrast\_calibration}(G,S,A), \text{ in short contrast}_{cal}(G,S,A)$$

estimating a function to establish a link between an image metric (for example the luminance) and the camera settings (for example the gain (G), the shutter speed (S), and the aperture (A)). According to embodiments, luminance is used during the operation phase to infer new calibration functions when scene lighting is modified. It may be expressed as follows:

$$\text{luminance} = f_{luminance\_calibration}(G,S,A), \text{ in short } I_{cal}(G,S,A)$$

FIG. 4a is a block diagram illustrating a first example of steps carried out during a calibration phase of an auto-setting method as illustrated in FIG. 3.

As illustrated, a first step (step 400) is directed to selecting camera settings. According to embodiments, this step comprises exploring the manifold of all camera setting values, for example all triplets of gain, shutter speed, and aperture values, and selecting a set of representative triplets in order to reduce the number of camera settings to analyse.

According to other embodiments, this step comprises exploring the manifold of all all pairs of gain and shutter speed values, and selecting a set of representative pairs in order to reduce the number of camera settings to analyse.

For the sake of illustration, the shutter speed values to be used may be selected as follows:

$$S_0=\min(S) \text{ and } S_{i+1}=S_i\times 2$$

with index i varying from 0 to n so that $S_n\leq\max(S)$ and $S_{n+1}>\max(S)$
and where $\min(S)$ is the smallest shutter speed and $\max(S)$ is the highest shutter speed.

If shutter speeds the camera may accept are discrete values, the shutter speeds are selected so that their values are the closest to the ones selected according to the previous relation (corresponding to a logarithmic scale).

Similarly, the gain values to be used may be selected according to a uniform linear scale as follows:
$G_0=\min(G)$ and
$G_{i+1}$ is determined such that $$\frac{I(G_{i+1})}{I(G_i)} \approx \frac{I(S_{i+1})}{I(S_i)}$$

with index i varying from 0 to n such that $G_n\leq\max(G)$ and $G_{n+1}>\max(G)$
and where I is the luminance of the image, $\min(G)$ is the smallest gain, and $\max(G)$ is the higher gain.

Likewise, the aperture values to be used may be selected according to a uniform linear scale, like the gain values, as follows:
$A_0=\min(A)$ and
$A_{i+1}$ is determined such that $$\frac{I(A_{i+1})}{I(A_i)} \approx \frac{I(S_{i+1})}{I(S_i)}$$

As a consequence, the gain, shutter speed, and aperture values have an equivalent scale in terms of impact on the luminance. In other words, if luminance of the image is increased by a value $\Delta$ when shutter speed value or aperture value goes from one value to the next, gain value is selected such that the luminance is also increased by the value $\Delta$ when moving from the current gain value to the next one.

After having selected a set of gain, shutter speed, and aperture values at step 400, images are obtained from the camera set to these values (step 405). For the sake of illustration, three to ten images may be obtained, preferably during a short period of time, for each triplet (G, S, A) of gain, shutter speed, and aperture values.

In order to optimize the time for obtaining these images and the stability of the camera during acquisition of the images, the change of camera settings is preferably minimized, i.e. the settings of the camera are preferably changed from one gain, shutter speed, and/or aperture value to the next ones (since it takes a longer time for a camera to proceed to large changes in gain, shutter speed, and aperture).

Therefore, according to embodiments, images are obtained as follows for each of the selected gain and shutter speed values:
- the aperture is set to its minimum value ($\min(A)$);
- the gain is set to its minimum value ($\min(G)$) and all the selected values of the shutter speed are set one after the other according to their ascending order (from $\min(S)$ to $\max(S)$), a number of three to ten images being obtained for each triplet of values (G, S, A);
- the value of the gain is set to the next selected one and all the selected values of the shutter speed are set one after the other according to their descending order (from $\max(S)$ to $\min(S)$), a number of three to ten images being obtained for each pair of values (G, S, A);
- the previous step is repeated with the next values of the gain until images have been obtained for all selected values of the gain and shutter speed; and
- the three previous steps are repeated with the next values of the aperture until images have been obtained for all selected values of the gain, shutter speed, and aperture.

Next, after having obtained images for all the selected values of the gain, shutter speed, and aperture, an image metric is measured for all the obtained images (step 410), here the luminance, and an image quality analysis is performed for each of these images (step 415).

The measurement of the luminance aims at determining a relation between the luminance of an image and the camera settings used when obtaining this image, for example a gain, a shutter, and an aperture values. For each obtained image, the luminance is computed and associated with the corresponding gain, shutter speed, and aperture values so as to determine the corresponding function or to build a 3-dimensional array wherein a luminance is associated with a triplet of gain, shutter speed, and aperture values (denoted $I_{cal}(G, S, A)$). According to embodiments, the luminance corresponds to the mean of pixel values (i.e. intensity values) for each pixel of the image.

According to embodiments, the entropy of the images is also computed during measurement of the luminance for making it possible to determine a contrast value during the image quality analysis. Like the luminance, the entropy is computed for each of the obtained images and associated with the corresponding gain, shutter speed, and aperture values so as to determine the corresponding function or to build a 3-dimensional array wherein an entropy is associated with a triplet of gain, shutter speed, and aperture values (denoted $E_{cal}(G, S, A)$). According to embodiments, measurement of the entropy comprises the steps of:
- determining the histogram of the image pixel values, for each channel (i.e. for each component), that is to say counting the number of pixels $c_i$ for each possible pixel value (for example for i varying from 0 to 255 if each component is coded with 8 bits); and
- computing the Shannon entropy according to the following relation:

$$E = -\Sigma_{i=0}^{255}\frac{c_i}{n}\log_2\left(\frac{c_i}{n}\right),$$

with n is the total number of pixels in all channels.

As described hereafter, the entropy may be determined as a function of the luminance (and not of the camera settings, e.g. gain, shutter speed, and aperture). Such a relationship between the entropy and the luminance can be considered as valid for any environmental conditions (and not only the environmental conditions associated with the calibration). Therefore, after having computed an entropy and a luminance for each of the obtained images, the entropy values are associated with the corresponding luminance values so as to determine the corresponding function or to build a 1-dimensional array wherein entropy is associated with luminance (denoted E(I)).

Turning back to FIG. 4a and as described above, the image quality analysis (step 415) aims at determining image quality parameter values, for example values of noise, blur, and contrast from the images obtained at step 405, in order to establish a relationship between each of these parameters and the camera settings used for obtaining the corresponding images. During this step, a relationship between the contrast and the luminance is also established.

Noise values are measured for the obtained images and the measured values are associated with the corresponding gain, shutter speed, and aperture values so as to determine the corresponding function or to build a 3-dimensional array wherein a noise value is associated with a triplet of gain, shutter speed, and aperture values (noise$_{cal}$(G, S, A)).

According to an embodiment, the noise of an image is determined as a function of a set of several images (obtained in a short period of time) corresponding to the same camera settings and as a result of the following steps:
removing the motion pixels, i.e. the pixels corresponding to objects in motion or in other words, removing the foreground;
computing a temporal variance for each pixel (i.e., the variance of the fluctuation of each pixel value over time, for each channel); and
computing a global noise value for the set of images as the mean value of the computed variances between all pixels and all channels.

The obtained values make it possible to establish a relationship between the noise and the camera settings.

Likewise, blur values are computed for the obtained images so as to establish a relationship between the blur and the camera settings. Each blur value corresponds to the addition of a motion blur value and a focus blur value.

According to embodiments, a motion blur value is determined as a function of a target velocity and of a shutter speed according to the following relation:

$$blur_S = \|\vec{v}_{target}\| * \text{shutter\_speed}$$

where $\vec{v}_{target}$ is the target velocity, the motion blur value being given in pixels, the target velocity being given in pixels/second, and the shutter speed being given in seconds.

Therefore, in view of the environmental conditions associated with the calibration phase (denoted "calibration environmental conditions"), the motion blur may be determined as follows:

$$blur_{S,cal}(S) = \|\vec{v}_{target}\| * S$$

The target velocity may be predetermined, set by a user, or measured from a sequence of images as described hereafter.

The focus blur may be determined according to different solutions.

According to particular embodiments, the solution to be used is determined as a function of whether or not targets of interest are moving. This can be set by a user or determined by image analysis.

If the targets of interest are moving, they are detected on obtained images, typically by using a standard image processing algorithm, and their size is determined by using knowledge on the target such as their real size and camera optical settings. Indeed, it is observed that targets generally belong to specific classes (for example humans, cars, bikes, trucks, etc.) and thus, they can be recognized and analyzed as a function of statistical information, for example to determine their size.

This makes it possible to compute the distance of the targets to the camera and to build a distance map within a considered region of interest. A distance map typically represents the distribution of target distances for locations of the considered region of interest or a distance value for locations of the considered region of interest that can be expressed as follows distance=$f_{distance}$(x, y) with x and y being the pixel coordinates, i.e. the row and column indices of each pixel. FIG. 4b illustrates an example of steps carried out for building a distance map of moving targets.

Figure 4C:
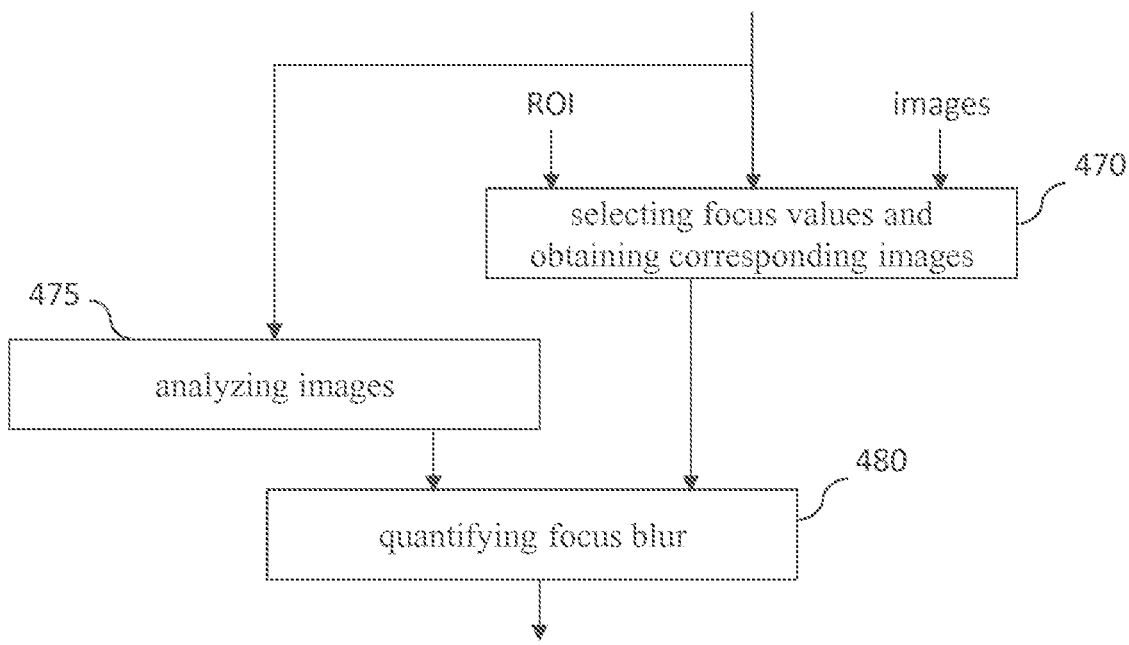
FIG. 4c is a block diagram illustrating an example of steps carried out for building a focus map of stationary targets from a region of interest and images.

On the contrary, if the targets (or at least a part of the targets) are stationary, the whole range of the focus may be explored while recording images for the different focus values that are used. The obtained images are analyzed and for locations of the considered region of interest, the focus leading to the sharpest images is determined so as to construct a focus map for the considered region of interest. A focus map typically represents the distribution of focus to be used for locations of the considered region of interest or a focus value to be used for locations of the considered region of interest that can be expressed as follows focus=$f_{focus}$(x, y). FIG. 4c illustrates an example of steps carried out for building a distance map of moving targets.

Next, the distance map or the focus map, depending on whether or not targets are moving, is used to compute an optical aperture and focus blur as a function of aperture values, based on geometric optics calculation.

It is observed that the function establishing a relation between target distances and locations within a considered region of interest is very close to the function establishing a relation between focus values and locations within this considered region of interest since an optimal focus value for a target only depends on the distance between this target and the camera. As a consequence, determining the optimal focus ($F_{optim}$) for a considered region of interest may consist in analyzing these regions of interest while varying the focus or in computing an optimal focus in view of the target distances within this region of interest. From this optimal focus, a focus blur may be determined by analyzing the region of interest or may be estimated as a function of the target distances within this region of interest.

According to embodiments, the optimal focus and the focus blur may be determined as a function of the distance map or focus map, denoted $f_{map}$(x, y), as follows, for moving targets:

$$F_{optimum} = \operatorname{argmin}_F \left( \left\langle F \times \left| \frac{1}{f_{map}(x, y)} - \frac{1}{d_F} \right| \right\rangle_{(x,y)ROI} \right)$$

and $$blur_A = A \times F_{optimum} \times \left\langle \left| \frac{1}{f_{map}(x, y)} - \frac{1}{d_F} \right| \right\rangle_{(x,y)ROI}$$

where $\langle \ \rangle_x$ corresponds to the operator "mean over x variable",
$\operatorname{argmin}_x$ corresponds to the operator "argmin over x variable", $$\frac{1}{d_F}$$

is the focal distance, that is to say the real distance of an object from the camera, for which the representation in the image is sharp for the current focus value. If it is not available, it can be retrieved from the image distance denoted v that corresponds to the distance between the lens and the sensor, according to the following relation:

$$\frac{1}{d_F} + \frac{1}{v} = \frac{1}{F},$$

for stationary targets:

$$F_{optimum} = \operatorname{argmin}_F \left( \left\| 1 - \frac{f_{map}(x, y)}{F} \right\| \right)_{(x,y) motionlessROI}$$

and $$blur_A = A \times \left( \left\| 1 - \frac{f_{map}(x, y)}{F_{optimum}} \right\| \right)_{(x,y) motionlessROI}$$

where motionlessROI corresponds to the considered region of interest wherein areas where motions are detected have been removed, as described by reference to FIG. 4c.

It is to be noted that the units of the results are given in the USI (m) for the focus blur and for the optimal focus. Regarding the focus blur, it is preferably expressed in pixels. This can be done according to the following formula:

$$blur_{A,pixels} = blur_{A,USI} \frac{resolution}{sensor\_size}$$

where resolution and sensor_size represent the resolution in pixels and the sensor size in USI, respectively.

The blur, comprising the motion blur and the focus blur (blur=$blur_S$+$blur_A$), is computed for each of the obtained images according to the previous relations and the obtained values are associated with the corresponding shutter speed and aperture values (the gain does not affect the blur) so as to determine the corresponding function or to build a 2-dimensional array wherein a blur value is associated with shutter speed and aperture values ($blur_{cal}$(S, A)).

Similarly, the contrast is computed for each of the obtained images. It may be obtained from the entropy according to the following relation:

$$contrast = \frac{2^{entropy}}{2^{max\_entropy}}$$

where, for example, max_entropy is equal to 8 when the processed images are RGB images and each component is encoded over 8 bits.

Accordingly, the contrast $contrast_{cal}$(G, S, A) may be obtained from the entropy $E_{cal}$(G, S, A). In other words, contrast values may be expressed as a function of the gain, of the shutter speed, and of the aperture values from the entropy expressed as a function of the gain, of the shutter speed, and of the aperture values.

Likewise, the contrast contrast(I) expressed as a function of the luminance may be obtained from the entropy E(I) that is also expressed as a function of the luminance. This can be done as a result of the following steps:

measuring the entropy of each of the obtained images;
determining the relationships between the measured entropy values and the camera settings, for example the gain, the shutter speed, and the aperture, denoted $E_{cal}$ (G, S, A);
obtaining the previously determined relationships between the luminance values and the camera settings, for example the gain, the shutter speed, and the aperture, denoted $I_{cal}$(G, S, A);
discarding selected camera settings corresponding to gain values leading to noise values that exceed a predetermined noise threshold (the noise may have an impact on the entropy when the noise is too large and thus, by limiting noise to variance values below a predetermined threshold, for example 5 to 10, the impact is significantly reduced);
gathering the remaining entropy values and luminance values, that are associated with gain, shutter speed, and the aperture values, to obtain a reduced data collection of entropy and luminance values sharing the same camera settings. This data collection makes it possible to establish the relationships between entropy and luminance values, for example by using simple regression functions such as a linear interpolation on the entropy and luminance values;
determining the relationships between the contrast and the entropy as a function of the luminance, for example according to the following relation:

$$contrast(I) = \frac{2^{E(I)}}{2^{max\_entropy}}$$

Turning back to FIG. 4a, it is illustrated how scene-dependent parameter values, for example target size and/or target velocity, may be obtained.

To that end, short sequences of consecutive images, also called chunks, are obtained. For the sake of illustration, ten to twenty chunks representative of the natural diversity of the targets are obtained.

According to particular embodiments, chunks are recorded by using the auto-mode (although the result is not perfect, the chunk analysis is robust to the blur and to the noise and thus, does not lead to significant errors). A motion detector of the camera can be used to detect motion and thus, to select chunks to be obtained.

The recording duration depends on the time it takes to get enough targets to reach statistical significance (10 to 20 targets is generally enough). Depending on the case, it can take only few minutes to several hours (if very few targets are spotted per hour).

In order to avoid waiting, it is possible to use chunk fetching instead of chunk recording (i.e. if the camera had already been used prior to the calibration step, the corresponding videos may be retrieved and used).

Alternatively, according to other embodiments, a user of the video surveillance system may be enabled to select the chunks to be used. The main advantage of this solution comes from the fact that such a user may know which chunks are representative of the targets that should be monitored by the system. Therefore, fewer chunks may be considered when the user manages to ensure that the relevant chunks have been chosen. It may even be possible for a user to select a single chunk. This makes the chunks determination and analysis process faster. To enable chunks selection, a dedicated user interface may be provided in the camera configuration user interface (e.g. as a specific tab in said camera configuration user interface). This enables a user to easily select chunks while configuring the camera. In addition, once chunks have been selected, a user interface may also advantageously provide access to the selected chunks and enable the selection to be edited by adding or removing chunks. This enables a user to check which chunks have been used for a given camera, and possibly to decide to replace them.

Chunks may be selected from among a set of existing recordings already recorded by a considered camera and displayed through a dedicated user interface; in this case, the user may be enabled to specify chunks as fragments of a recording, typically by indicating a start time and an end time. Multiple chunks may be specified from a single recording. Another solution may consist in enabling the user to record a chunk with a considered camera. By doing so, the user can easily create a chunk that contains the types of targets that should be monitored.

In any case, it may be also advantageous to clearly indicate to the user the status of chunks, i.e. whether the chunks have to be specified, whether the chunks are being processed, or whether the chunks have been processed. As a matter of fact, this enables a potential user who may be involved in the process to understand the behavior of the system: as long as the chunks have not been obtained, auto-setting cannot be fully operational. Once they have been obtained (from user or automatically), indicating that they are being processed enables the user to understand that auto-setting is not yet fully operational but that it will soon be. Finally, when chunks have been obtained and processed, the user can understand that auto-setting is fully operational (provided other steps of the auto-setting process have also been successfully performed). After being obtained, the chunks are analyzed to detect targets (step 425) to make it possible to estimate (step 430) their size and preferably their velocity and distance (for moving targets). This estimating step may comprise performing a statistical analysis of the values of the parameters of interest (e.g. target size, target velocity). Next, the mean, median, or any other suitable value extracted from the distribution of parameter values is computed and used as the value of reference.

The velocity of targets can be very accurately derived by tracking some points of interest of the target. By using this in combination with a background subtraction method (e.g. the known MOG or MOG2 method described, for example, in Zoran Zivkovic and Ferdinand van der Heijden, "*Efficient adaptive density estimation per image pixel for the task of background subtraction*". Pattern recognition letters, 27(7): 773-780, 2006), it is possible to avoid the detection of the fixed points of interest from the background and thus, to determine velocity with high accuracy even with blurry targets. The target velocity is simply the main velocity of points of interest.

Figure 5:
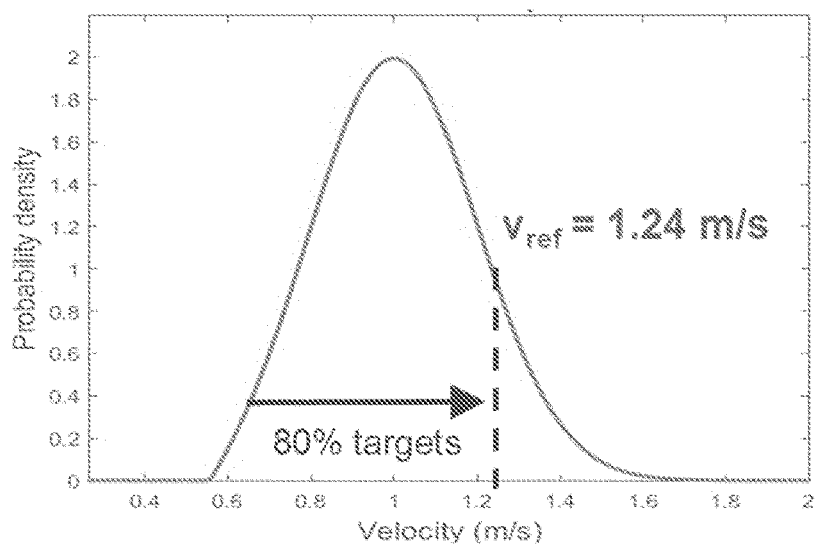
FIG. 5 illustrates an example of the distribution of the target velocity.

FIG. 5 illustrates an example of the distribution of the target velocity (or, similarly, the distribution of the velocity of the points of interest). From such a representation, a target velocity value may be obtained. For the sake of illustration, it can be chosen so as to correspond to the mean velocity for given targets. For the sake of illustration, one can choose a value corresponding to the "median 80%", i.e. a velocity value such that 80% of velocities are under this value and 20% of velocities are over this value.

The target size can be obtained through methods as simple as background subtraction, or more sophisticated ones like target detection algorithms (e.g. face recognition, human detection, or license plate recognition), which are more directly related to the detection of the targets corresponding to the task. Deep learning methods are also very effective. Outliers can be removed by using consensus-derived methods, or by using combinations of background subtraction and target detection at the same time. However, since only statistical results are obtained, it does not matter if some errors exist with such algorithms, since the errors should be averaged out to zero. This tolerance to errors makes such methods robust.

FIG. 4b is a block diagram illustrating an example of steps carried out for building a distance map of moving targets from a region of interest (ROI), a focus value (F), and images.

As illustrated, a first step is directed to target detection in a given region of interest in images (step 450), for example in the images of the chunks obtained in step 420. Detecting targets may be based on standard algorithms. For the sake of illustration, there exist deep learning-based computer vision methods that are really efficient for detecting well-known targets such as humans, pets, and vehicles, with a low error rate. Examples of such methods are known as "You Only Look Once" (YOLO, https://arxiv.org/pdf/1612.08242.pdf), "Single Snapshot MultiBox Detector" (SSD, https://arxiv.org/pdf/1512.02325.pdf), and "Faster RCNN" (https://arxiv.org/pdf/1506.01497.pdf).

This makes it possible to localize the targets of interest depending on their types. As a result, for each analyzed image, a bounding box surrounding the identified target is obtained. The bounding box height and width correspond approximately to the target size denoted bounding_box_size.

Next, the poses of the detected targets are estimated (step 455). This can be done by using similar techniques of computer vision based on the image of each detected target, which make it possible to determine the angle of the target relative to the camera and thus, to estimate its pose.

Next, a target size is obtained for as many locations as possible of the considered region of interest, resulting in a target size map (step 460). To that end, the real size, for example in pixels, is estimated for each detected target, for example according to the following formula:

$$target_{size} = \frac{bounding\_box\_size}{\cos(\alpha)}$$

where bounding_box_size is the apparent size of the detected target as obtained in step 450, and $\alpha$ is the angle of the detected target relative to the camera as obtained in step 455, The results for all the detected targets and all the analyzed images are concatenated. It is to be noted that for each detected target, a point of reference can be used, for example the centroid of the bounding box and the target size can be associated with this point.

As a result, a collection of sizes associated with locations in the considered region of interest is obtained. It can be represented as a list of target sizes {size0, size1, . . . , sizen} associated with a list of coordinates {(x0,y0), (x1,y1), . . . , (xn,yn)}, where sizei is the target size value corresponding to the location having index i.

These results are then used to obtain a map of the target size (target size map). This can be done by using a regression method, such as linear or nonlinear regression (e.g. svm, gradient boosting, or even deep-learning techniques) applied to the size results associated with the coordinates.

Next, the distance map is computed (step 465). This can be done by converting the obtained target size map, where sizes are expressed in pixels, into a distance map, for example according to the following formula, applied to each location of the target size map:

$$distance = F \frac{real\_size}{pixel\_size}$$

where

F is the focus value used during image acquisition (corresponding to the settings of the camera), real_size is the real-world size of the target (that may be determined statistically by using a priori knowledge about the targets, for example, it can be set that the mean size of adults is ~1.75 m). In order to increase the accuracy of such value, the median size or any derivative of the statistical size of the targets can also be used, and pixel_size is obtained from each point of the considered region of interest as computed during step 465. The result is a distance map, i.e. a function distance=(x) for each location (x,y) of the considered region of interest.

Steps 450 to 465 of FIG. 4b may be carried out during steps 425 and 430 of FIG. 4a.

FIG. 4c is a block diagram illustrating an example of steps carried out for building a focus map of stationary targets from a region of interest and images.

It is observed that stationary targets like machinery or buildings can be very diverse in nature. Therefore, since every building is unique and since there are so many existing machines, recognizing such types of targets according to common features would not be efficient.

However, these targets being stationary or at least partially stationary, it is possible to compare their representation in different images, in particular in images obtained with different focus values so as to determine an optimal focus value for each area of the considered region of interest, making it possible to build a focus map associating a focus value with each location of the considered region of interest.

As illustrated in FIG. 4c, a first step is directed to sampling the focus values that are available in the camera in order to get a finite number of focus values and to obtain at least one image for each sampled focus value (step 470). For the sake of illustration, a linear sampling of the focus values F may be performed or a more sophisticated sampling such as a linear sampling of the inverse value of focus values 1/F. According to other embodiments, the default sampling of the camera can be used (it being noted that most of the cameras have only a limited number of available focus values).

The images corresponding to each of the sampled focus values are preferably obtained from the obtained chunks (for example the chunks obtained at step 420).

Next, the obtained images are analyzed to identify areas where motion is detected (step 475). According to embodiments, areas wherein few movements are detected are not considered. Such detection can be based on a standard motion detection mechanism, by using a motion activity threshold.

As a result, a subpart of the considered region of interest where no motion or small movements have been detected (i.e. corresponding to the considered region of interest wherein the areas where movements have been detected are removed) is obtained. It is referred to as the motionless region of interest (denoted motionlessROI).

Next, an optimal focus is determined for each location of the motion less region of interest (step 480), so that the obtained sharpness is at a maximum value. In other words, the focus that provides the maximum microcontrast in the vicinity of this point is determined. As a consequence, the focus blur is minimum (as close as possible to 0) for this focus value. Several techniques make it possible to analyse the blur or the microcontrast of a point or some points.

Accordingly, for each location of the motionless region of interest, a focus value providing a maximum microcontrast is obtained, leading to a list of locations or points denoted {(x0,y0), (x1,y1), . . . , (xn,yn)} and to a list of corresponding focus values denoted {focus0,focus1, . . . focusn}, where focusi is the focus value corresponding to a maximum microcontrast for the location having index i.

Since the motionless region of interest may comprise areas where small movements have been detected, the previous analysis may lead to sources of uncertainty and thus to outliers.

In order to increase the accuracy and remove these outliers, a regression performed on the focus values and locations may be performed using well-known regression technique such as linear or nonlinear regression (e.g. svm, gradient boosting, or even deep-learning techniques) to obtain a mapping associating a focus value with a location for each point of the motionless region of interest (denoted focus=(x,y). As described above, this mapping is referred to as the focus map.

Operation Phase

As described previously, the operation phase aims at improving camera settings, preferably at determining optimal (or near-optimal) camera settings for a current mission and current environmental conditions, without perturbing significantly the use of the camera. To that end, the operation phase is based on a prediction mechanism (and not on an exploration/measurement mechanism). It uses, in particular, the quality function ($f_{quality}$) determined in the learning phase, the relationships between image quality parameters and camera settings (e.g. $noise_{cal}$(G, S, A), $blur_{cal}$(G, S, A), and $contrast_{cal}$(G, S, A)) determined during the calibration phase, scene-dependent parameters also determined during the calibration phase, and image metrics relating to images obtained with the current camera settings.

Indeed, since the environmental conditions of the calibration phase and the current environmental conditions (i.e. during the operation phase) are not the same, the new relationships between image quality parameters and camera settings should be predicted so as to determine camera settings as a function of the quality function, without perturbing the camera.

According to embodiments, the noise may be predicted from the gain, independently from the shutter speed and the aperture. Moreover, it is independent from lighting conditions. Therefore, the relationships between the noise and the gain for the current environmental conditions may be expressed as follows:

$$noise_{current}(G) = noise_{cal}(G)$$

wherein the noise value associated with a given gain value corresponds to the mean noise for this gain and all the shutter speed values associated with it.

If a noise value should be determined for a gain value that has not been selected during the calibration phase (i.e., if there is a gain value for which there is no corresponding noise value), a linear interpolation may be carried out.

Table 1 in the Appendix gives an example of the relationships between the noise and the gain.

Still according to embodiments, the blur may be determined as a function of the target velocity and the shutter speed (motion blur) and of the aperture (focus blur), as described above. It does not depend on lighting conditions. Accordingly, the relationships between the blur and the shutter speed and the aperture for the current environmental conditions may be expressed as follows:

$$blur_{current}(G, S, A) = blur_{cal}(S, A)$$

Table 2 in the Appendix gives an example of the relationships between the blur and the shutter speed.

Still according to embodiments, prediction of the contrast as a function of the camera settings according to the current environmental conditions (denoted $contrast_{current}(G, S, A)$) comprises prediction of the luminance as a function of the camera settings for the current environmental conditions (denoted $I_{current}(G, S, A)$) and the use of the relationships between the contrast and the luminance (contrast(I)) according to the following relation:

$$contrast_{current}(G, S, A) = contrast_{current}(I_{current}(G, S, A))$$

Prediction of the luminance as a function of the camera settings for the current environmental conditions ($I_{current}(G, S, A)$) may be based on the luminance expressed as a function of the camera settings for the calibration environmental conditions (noted $I_{cal}(G, S, A)$) and on a so-called shutter shift method.

The latter is based on the assumption that there is a formal similarity between a change in lighting conditions and a change in shutter speed. Based on this assumption, the current luminance $I_{act}$ may be expressed as follows:

$$I_{act} = I_{current}(G_{act}, S_{act}, A_{act}) = I_{cal}(G_{act}, S_{act} + \Delta S, A_{act})$$

where ($G_{act}$, $S_{act}$, $A_{act}$) is the current camera settings and $\Delta S$ is a shutter speed variation.

Therefore, the relationship between the luminance and the camera settings for the current environmental conditions may be determined as follows:
- interpolating the computed luminance values $I_{cal}(G, S, A)$ to obtain a continuous or pseudo-continuous function;
- for the current gain $G_{act}$, determining $\Delta S$ so that $I_{cal}(G_{act}, S_{act}+\Delta S, A_{act})=I_{act}$ for example by using the inverse function of the luminance expressed as a function of the shutter speed (for the current gain $G_{act}$), i.e. the shutter speed expressed as a function of the luminance, and computing $\Delta S$ as $\Delta S=S(I_{act})-S_{act}$; and
- determining the whole function $I_{current}(G,S, A)$ by using the formula $I_{current}(G, S, A)=I_{cal}(G, S+\Delta S, A)$ However, if the assumption that there is a formal similarity between a change in lighting conditions and a change in shutter speed is correct in the vicinity of the current camera settings, it is not always true for distant camera settings. Accordingly, an iterative process may be used to determine the camera settings to be used, as described hereafter.

Table 3 in the Appendix gives an example of the relationships between the contrast and the gain, the shutter speed, and the aperture.

After having predicted the image quality parameters for the current environmental conditions, optimization of the current camera settings may be carried out. It may be based on a grid search algorithm according to the following steps:
- sampling the manifold of possible gain, shutter speed, and aperture values to create a 3D grid of different ($G_{pred}$, $S_{pred}$, $A_{pred}$) triplets;
- for each of the ($G_{pred}$, $S_{pred}$, $A_{pred}$) triplets, denoted ($G_{pred,i}$, $S_{pred,j}$, $A_{pred,k}$), computing the values of the image quality parameters according to the previous predictions ($noise_{current}(G_{pred,i})$, $blur_{current}(S_{pred,j}, A_{pred,k})$, and $contrast_{current}(I(G_{pred,i}, S_{pred,j}, A_{pred,k}))$);
- for each ($G_{pred,i}$, $S_{pred,j}$, $A_{pred,k}$) triplet, computing a score as a function of the quality function determined during the learning phase, of the current mission ($mission_{act}$), and of the computed values of the image quality parameters as follows:

$$score_{i,j,k}=f_{quality}(mission_{act})(noise_{current}(G_{pred,i}),$$
$$blur_{current}(S_{pred,j}, A_{pred,k}), \text{ and } contrast_{current}(I$$
$$(G_{pred,i}, S_{pred,j}, A_{pred,k})), \text{target\_size,target\_velocity})$$

where target_size and target_velocity values have been calculated during the calibration phase,
- identifying the best score (or one of the best scores), i.e. $\max(score_{i,j})$, to determine the camera settings to be used, i.e. ($G_{next}$, $S_{next}$, $A_{next}$)=argmax($score_{i,j,k}$).

Table 4 in the Appendix gives an example of the relationships between the score and the gain, the shutter speed, and the aperture.

In order to improve the accuracy of the camera settings, the latter may be determined on an iterative basis (in particular to take into account that the assumption that there is a formal similarity between a change in lighting conditions and a change in shutter speed is not always true for distant camera settings).

Accordingly, after the next camera settings have been determined, as described above, and set, the luminance corresponding to these next camera settings is predicted ($I_{pred}=I_{current}(G_{next}, S_{next}, A_{next})$), a new image corresponding to these camera settings is obtained, and the luminance of this image is computed. The predicted luminance and the computed luminance are compared.

If the difference between the predicted luminance and the computed luminance exceeds a threshold, for example a predetermined threshold, the process is repeated to determine new camera settings. The process may be repeated until the difference between the predicted luminance and the computed luminance is less than the threshold or until camera settings are stable.

It is to be noted that region of interests (ROIs) may be taken into account for determining image quality parameter values (in such a case, the image quality parameter values are determined from the ROIs only) and for optimizing camera settings.

Figure 6A:
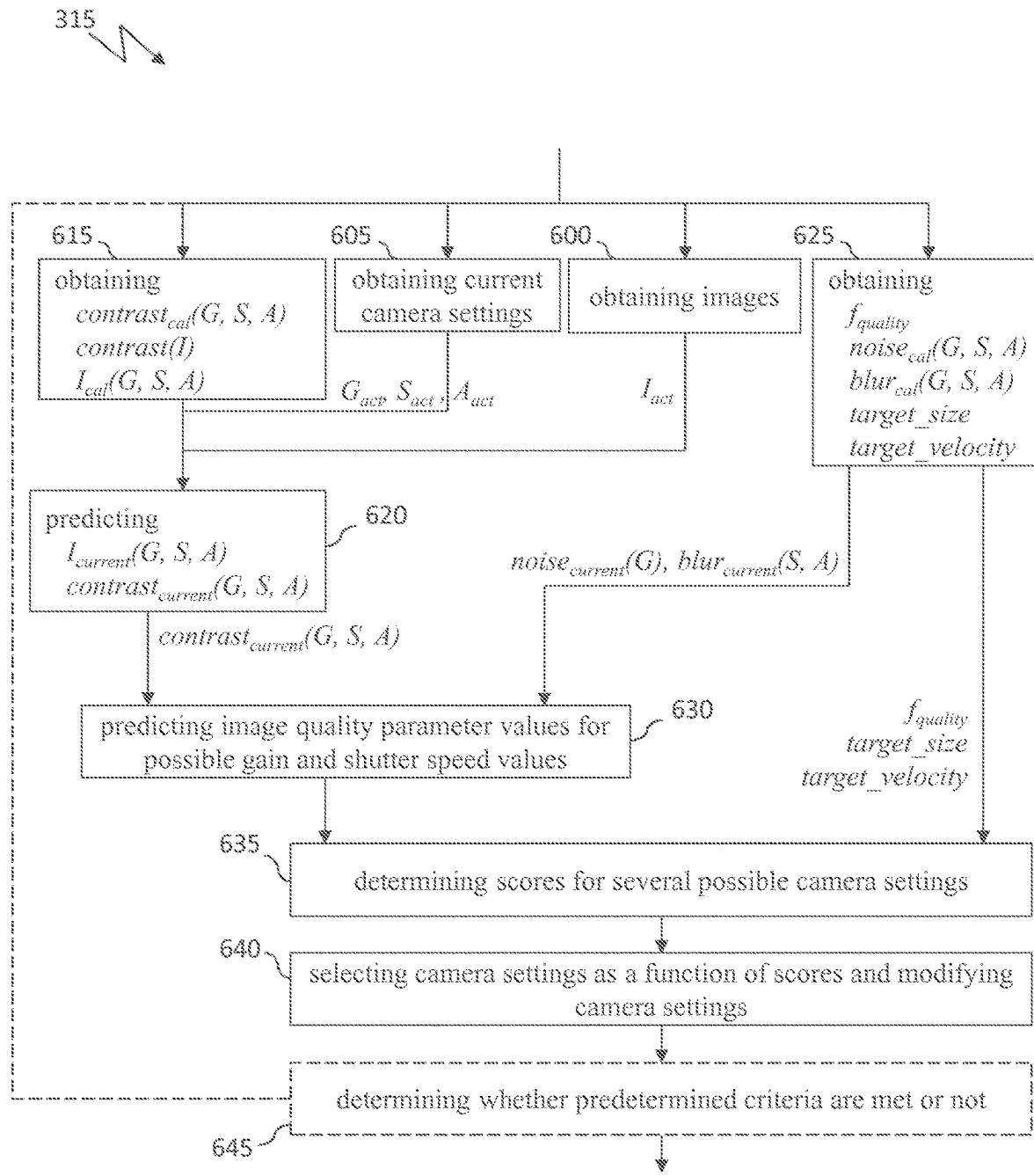
FIGS. 6a, 6b, and 6c illustrate examples of steps for determining new camera settings during the operational use of a camera, without perturbing the use of the camera.

FIG. 6a illustrates a first example of steps for determining new camera settings during the operational use of a camera, without perturbing the use of the camera. This may correspond at least partially to step 315 in FIG. 3.

As illustrated, first steps are directed to:
- obtaining images (step 600) from a camera set with current camera settings, from which an actual luminance ($I_{act}$) may be computed,
- obtaining these camera settings (step 605), i.e. the actual gain, the shutter speed, and aperture ($G_{act}$, $S_{act}$, $A_{act}$) in the given example, and
- obtaining the relationships (step 615) between the contrast and the camera settings for the calibration environmental conditions (contrast$_{cal}$(G, S, A)), between the contrast and the luminance (contrast(I)), and between the luminance and the camera settings for the calibration environmental conditions ($I_{cal}$(G, S, A)).

Next, the relationships between the luminance and the camera settings for the current environmental conditions ($I_{current}$(G, S, A)) and the relationship between the contrast and the camera settings for the current environmental conditions (contrast$_{current}$(G, S, A)) are predicted (step 620), for example using the method and formula described above.

In parallel, before, or after, the quality function ($f_{quality}$), the relationships between the noise and the camera settings for the calibration environmental conditions (noise$_{cal}$(G, S, A)), the relationships between the blur and the camera settings for the calibration environmental conditions (blur$_{cal}$(G, S, A)), and the scene-dependent parameter values, e.g. the target size and preferably the target velocity, are obtained (step 625).

Next, these relationships as well as the relationships between the contrast and the camera settings for the current environmental conditions (contrast$_{current}$(G, S, A)) are used to predict image quality parameter values for possible gain, shutter speed, and aperture values (step 630). As described above, these image quality parameter values may be computed for different ($G_{pred}$, $S_{pred}$, $A_{pred}$) pairs forming a 3D grid.

These image quality parameter values are then used with the scene-dependent parameter values to compute scores according to the previously obtained quality function (step 635). According to embodiments, a score is computed for each of the predicted image quality parameter values.

Next, optimized camera settings are selected as a function of the obtained scores and the settings of the camera are modified accordingly (step 640).

According to embodiments, it is determined whether or not predetermined criteria are met (step 645), for example whether or not the actual luminance of an obtained image is close to the predicted luminance.

If the criteria are met, the process is stopped until a new optimization of the camera settings should be made. Otherwise, if the criteria are not met, new camera settings are estimated, as described above.

According to embodiments and as described above, prediction of the luminance as a function of the camera settings for the current environmental conditions ($I_{pred}$(G, S, A) or $I_{current}$(G, S? a)) may be based on the luminance expressed as a function of the camera settings for the calibration environmental conditions ($I_{cal}$(G, S, A)) and computed according to the shutter shift method.

However, it has been observed that the accuracy of the results obtained according to these embodiments is increasingly better when current environmental conditions get closer to the calibration environmental conditions and that it decreases when current environmental conditions deviate from the calibration environmental conditions. This may lead to prediction errors, e.g. when trying at night to apply the results of a calibration performed at the brightest hours of a day for an outdoor camera.

Accordingly, it may be efficient to determine the relationships between the luminance and the camera settings for different calibration environmental conditions i (denoted $I_{cal}^{i}$(G,S,A)), i varying, for example, from 0 to n.

In such a case, the relationships between the luminance and the camera settings to be used for the current environmental conditions may be selected from among all the relationships between the luminance and the camera settings determined during the calibration phase ($I_{cal}^{i}$(G, S, A)) so that:

$$i = \mathrm{argmin}_i \big( |I_{act} - I_{cal}^{i}(G_{act}, S_{act}, A_{act})| \big)$$

In other words, the relationships associated with the calibration environmental conditions i are selected so as to minimize the gap between the measured luminance ($I_{act}$) and the luminance ($I_{cal}^{i}(G_{act}, S_{act}, A_{act})$) obtained in the same conditions (i.e. for same G, S, and A as in the current situation).

Figure 6B:
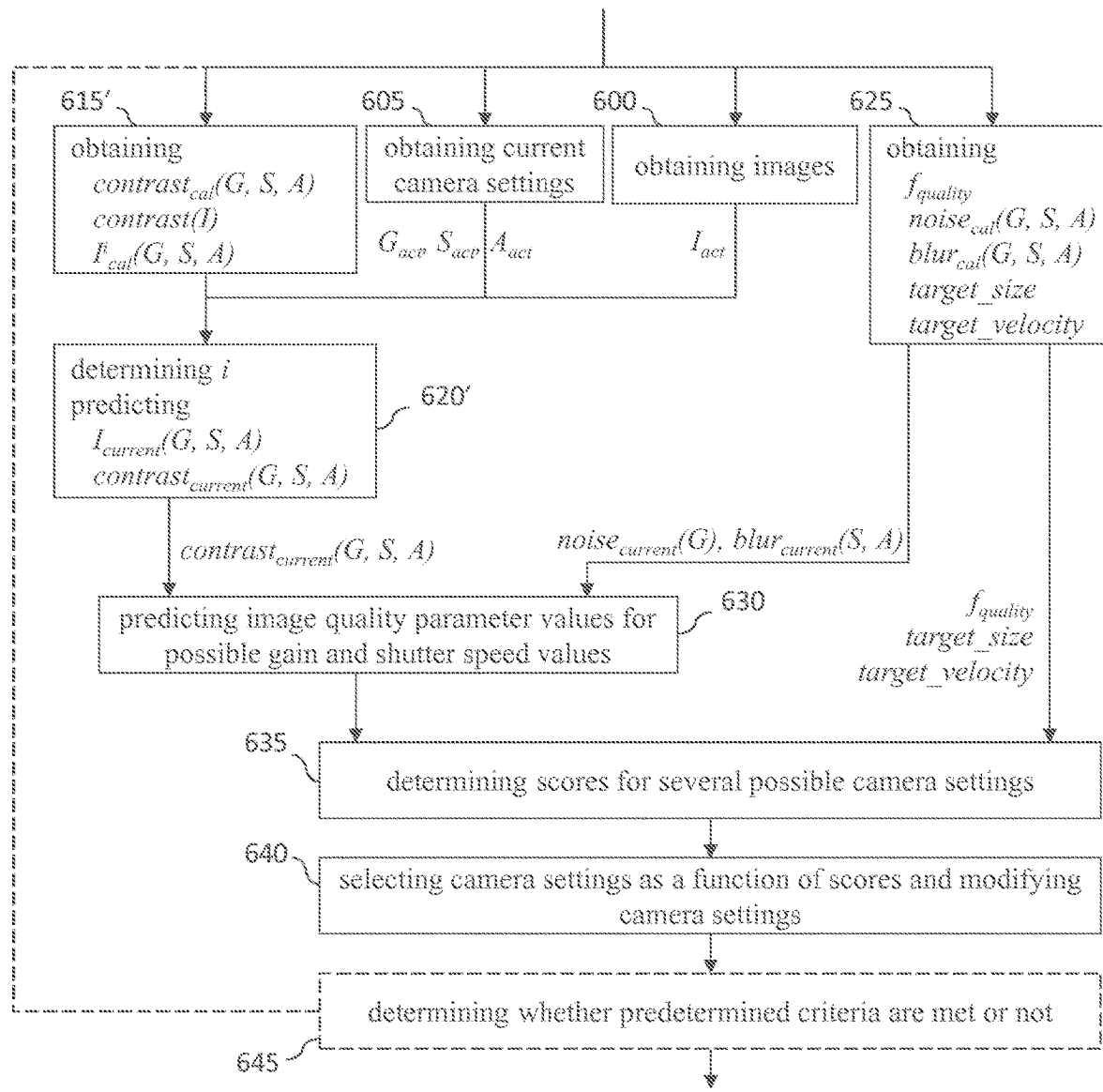

FIG. 6b illustrates a second example of steps for determining new camera settings during the operational use of a camera, without perturbing the use of the camera.

As illustrated, the steps are similar to those described with reference to FIG. 6a except steps 615' and 620'.

According to the illustrated example, step 615' is similar to step 615 described with reference to FIG. 6a except that several relationships between the luminance and the camera settings ($I_{cal}^{i}$(G, S, A)) corresponding to different environmental conditions i are obtained.

In step 620', the relationships between the luminance and the camera settings corresponding to the calibration environmental conditions i that are the closest to the current environmental conditions are selected (i.e. i is determined) and the relationships between the luminance and the camera settings for the current environmental conditions ($I_{current}$(G, S, A)) and the relationship between the contrast and the camera settings for the current environmental conditions (contrast$_{current}$(G, S, A)) are predicted, for example using the method and formula described above.

It has been observed that such a way of determining the relationships between the luminance and the camera settings provides accurate results as long as the current environmental conditions are not too far from the calibration environmental conditions. As a consequence, if the current environmental conditions are too far from the calibration environmental conditions, it may be appropriate to determine new relationships between the luminance and the camera settings.

Therefore, according to particular embodiments, the relationships between the luminance and the camera settings ($I_{cal}$(G, S, A)) for the current environmental conditions may be determined if the latter are too different from the calibration environmental conditions.

Indeed, the obtained relationships between the luminance and the camera settings should correspond to environmental conditions uniformly spanning the whole manifold of environment conditions. However, since there is no way of setting the environment conditions, it is not possible to obtain relationships between the luminance and the camera settings at will, for example during a complete calibration process. Accordingly, it may be useful to detect when environmental conditions are suitable for obtaining new relationships between the luminance and the camera settings and then, possibly, obtain these new relationships. This can be done during operational use of the camera.

Obtaining the relationships between the luminance and the camera settings may consist in carrying out steps 400, 405, and 410 (at least the step of measuring image metrics $I_{cal}(G,S, A)$) described with reference to FIG. 4a, for the current environmental conditions.

According to a particular embodiment, detection of environmental conditions that should trigger obtaining relationships between the luminance and the camera settings for the current environmental conditions may be based on direct measurements of the current environmental conditions via a sensor, for example a light meter. By comparing the current output of the sensor (environment_value$_{act}$) with its output(s) during the calibration phase (environment_value$_{calibration}$), one may determine whether or not the relationships between the luminance and the camera settings should be determined for the current environmental conditions. For example, if the difference between these outputs is greater than a predetermined threshold (|environment_value$_{act}$−environment_value$_{calibration}$|>threshold), the relationships between the luminance and the camera settings is determined for the current environmental conditions.

Still according to a particular embodiment, the environmental conditions may be determined indirectly through the images, by comparing the luminance value ($I_{act}$) of a current image with the corresponding one associated with the calibration environmental conditions (i.e. the luminance associated with the corresponding camera settings ($I_{calibration}(G_{act}, S_{act}, A_{act})$). Again, for the sake of illustration, if the difference between these values is greater than a predetermined threshold (|$I_{act}$−$I_{calibration}(G_{act}, S_{act}, A_{act})$|>threshold), the relationships between the luminance and the camera settings is determined for the current environmental conditions.

Still according to a particular embodiment, triggering a step of obtaining the relationships between the luminance and the camera settings for the current environmental conditions is based on measuring an error prediction. This can be done by comparing the predicted luminance value ($I_{pred}(G_{act}, S_{act}, A_{act})$ or $I_{current}(G_{act}, S_{act}, A_{act})$) with the luminance value ($I_{act}$) of a current image. To that end, predicted luminance values are advantageously stored after setting new camera settings (e.g. step 640 in FIG. 6a or 6b).

Still for the sake of illustration, if the difference between these values is greater than a predetermined threshold (|$I_{act}$−$I_{pred}(G_{act}, S_{act}, A_{act})$|>threshold), the relationships between the luminance and the camera settings is determined for the current environmental conditions.

Alternatively, the relationships between the luminance and the camera settings is determined for the current environmental conditions if $$\left| \frac{I_{pred}(G_{act}, S_{act}, A_{act}) - I_{act}}{I_{act} - \frac{I_{max}}{2}} \right| > \text{threshold}$$

where $I_{max}$ represents the luminance maximum possible value.

It is observed that the last embodiment is generally more efficient than the others in that it is based on a parameter (luminance prediction) that is to be optimized. Moreover, it does not require any additional sensor.

It is further observed that determining the relationships between the luminance and the camera settings is an invasive process for the camera since images from this camera are not usable for other purpose during such a step. It may take few minutes. For this reason, approval from the user is preferably requested before carrying out such a step.

Figure 6C:
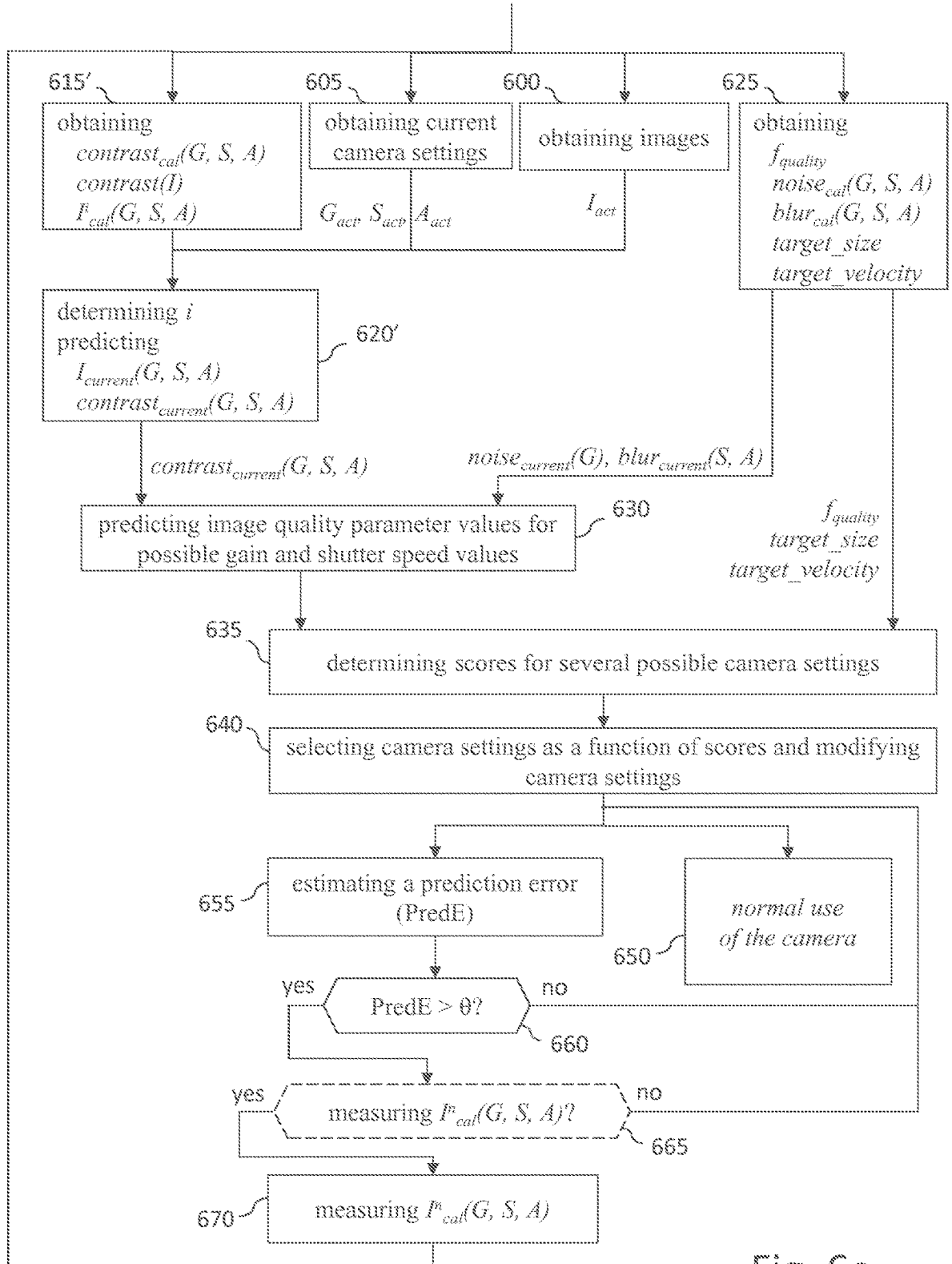

FIG. 6c illustrates another example of steps for determining new camera settings during the operational use of a camera, while perturbing as little as possible the use of the camera.

Steps 600 to 640 are similar to the corresponding steps described by reference to FIG. 6b.

As illustrated, once camera settings have been modified, the camera is used for its purpose on a standard basis (step 650).

In parallel, a prediction error (PredE) is estimated (step 655). Such a prediction error is typically based on the predicted luminance value ($I_{pred}(G_{act}, S_{act}, A_{act})$ or $I_{current}(G_{act}, S_{act}, A_{act})$) and the current luminance value ($I_{act}$), as described above.

Next, this prediction error is compared to a threshold ($\theta$) (step 660). If the prediction error is greater than the threshold, it is preferably proposed to a user to measure the luminance for several camera settings so as to obtain new relationships between the luminance and the camera settings ($I^n_{cal}(G, S,A)$) (step 665). As described above, this step is optional.

If it is determined that the luminance is to be measured for several camera settings according to the current environmental conditions (denoted n) for obtaining new relationships between the luminance and the camera settings ($I^n_{cal}(G,S,A)$), these steps are carried out (step 670). As mentioned above, this can be done by carrying out steps 400, 405, and 410 (at least the step of measuring image metrics $I^n_{cal}(G,S,A)$) described in reference to FIG. 4, for the current environmental conditions.

Then, the camera settings are determined and the settings of the camera are modified as described above, for example by reference to FIG. 6b.

According to particular embodiments, the calibration data are associated with environmental conditions corresponding to a single given time (i.e. the calibration data are associated with a single given type of environmental conditions). In such a case, new calibration data corresponding to new environmental conditions are stored in lieu of the previous calibration data.

While the process described above aims at optimizing camera settings on a request basis, for example upon request of a user, it is possible to control automatically the triggering of the process of auto-setting camera parameters. It is also possible to pre-determine camera settings so that as soon as conditions have changed significantly, new settings are applied instantaneously without calculations. Such an automatic process presents several advantages among which are:
  the whole operation phase is automated and can be run continuously without any user decision;
  the time needed to make changes of camera settings is much reduced between the decision to change and the change itself; and
  such an auto-setting-monitored system is able to react very quickly to a sudden change of environment conditions such as on/off lighting.

To that end, the current camera setting values and the luminance value should be obtained on a regular basis. The other steps of the operation phase remain basically the same since computations are based on these values and on values determined during the calibration phase.

According to particular embodiments, predicting image quality parameter values (e.g. steps 620 and 630 in FIG. 6a), determining scores for camera settings (e.g. step 635 in FIG. 6a), and enabling selection of camera settings are carried out in advance, for example at the end of the calibration phase, for all (or many) possible measurement values such as the gain, shutter speed, aperture, and luminance (G, S, A, I).

This leads to a best camera setting function that gives optimized camera settings as a function of camera settings and luminance in view of the values obtained during the calibration phase. Such a best camera setting function may be expressed as follows:

$$(G_{next}, S_{next}, A_{next}) = \text{best\_camera\_settings}(G, S, A, I)$$

To determine such a continuous function, a simple data regression or an interpolation may be used.

Operation phase mainly consists in measuring the current camera setting values and the luminance of the current image ($G_{act}$, $S_{act}$, $A_{act}$, $I_{act}$) and determining optimized camera settings as a result of the best camera setting function determined during the calibration phase. If optimal determined camera setting values ($G_{next}$, $S_{next}$, $A_{next}$) are different from the current values ($G_{act}$, $S_{act}$, $A_{act}$), the camera settings are changed.

Figure 7:
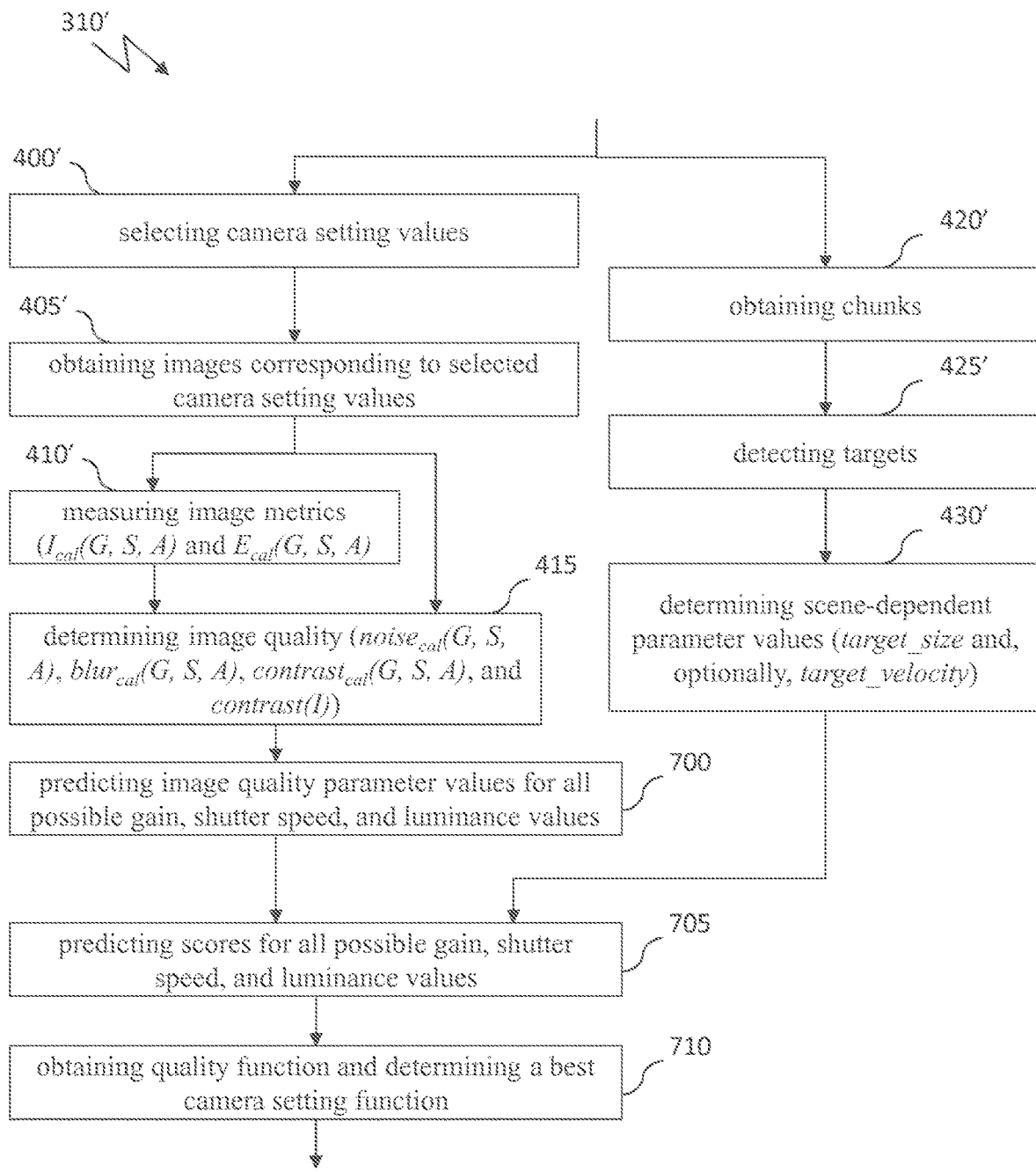
FIG. 7 is a block diagram illustrating a second example of steps carried out during a calibration phase of an auto-setting method as illustrated in FIG. 3.

FIG. 7 is a block diagram illustrating a second example of steps carried out during a calibration phase of an auto-setting method as illustrated in FIG. 3.

The steps illustrated in FIG. 7 differ as a whole from the those of FIG. 4 in that they comprise steps of predicting image quality parameter values (step 700), of determining scores for camera settings and luminance values (step 705), and of determining a function for determining camera settings (step 710), for all possible camera setting values and for all possible luminance values (G, S, A, I).

Figure 8:
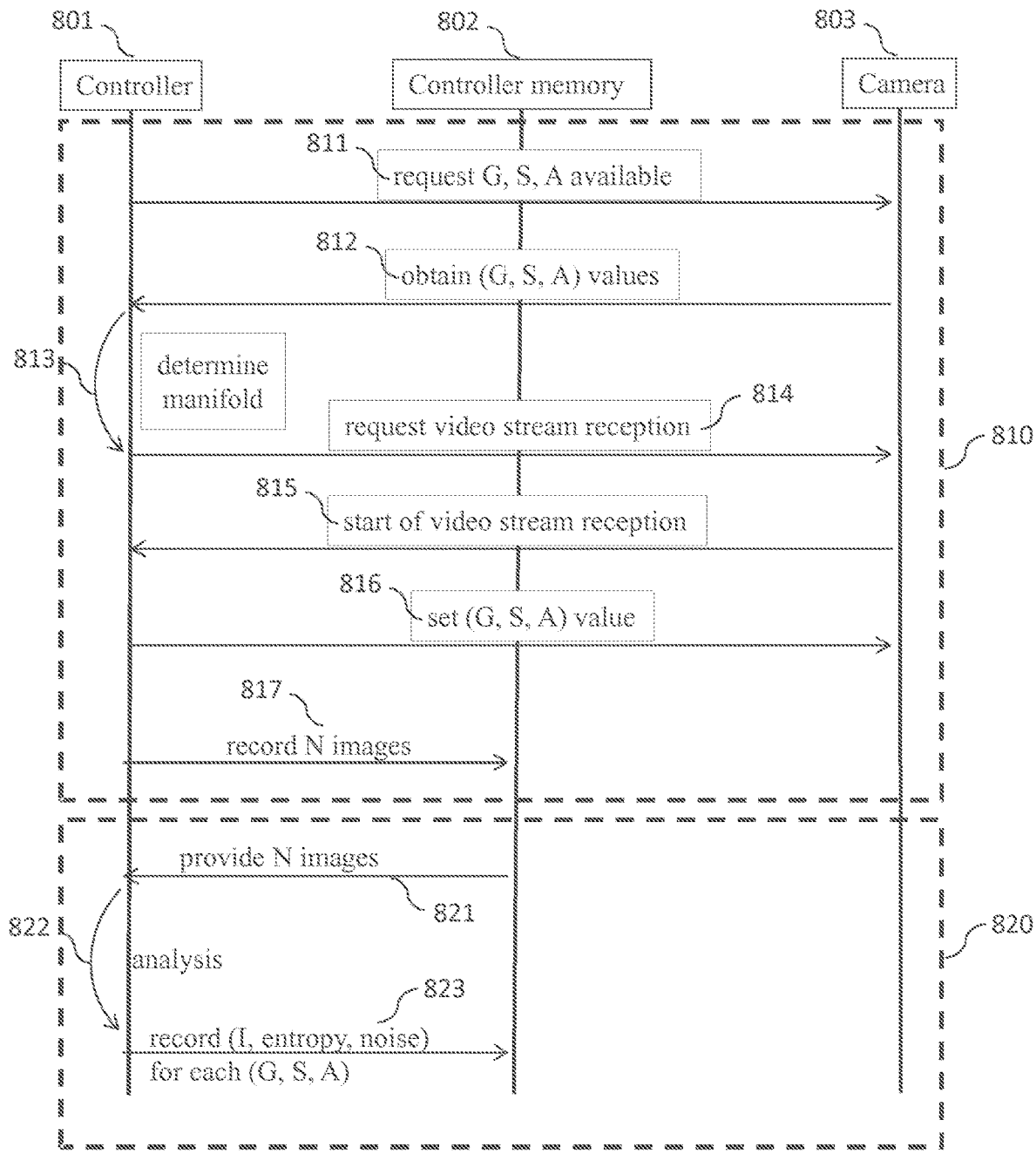
FIGS. 8 and 9 are sequence diagrams illustrating an example of steps carried out during a calibration phase of an auto-setting method as illustrated in FIG. 3.
Figure 9:
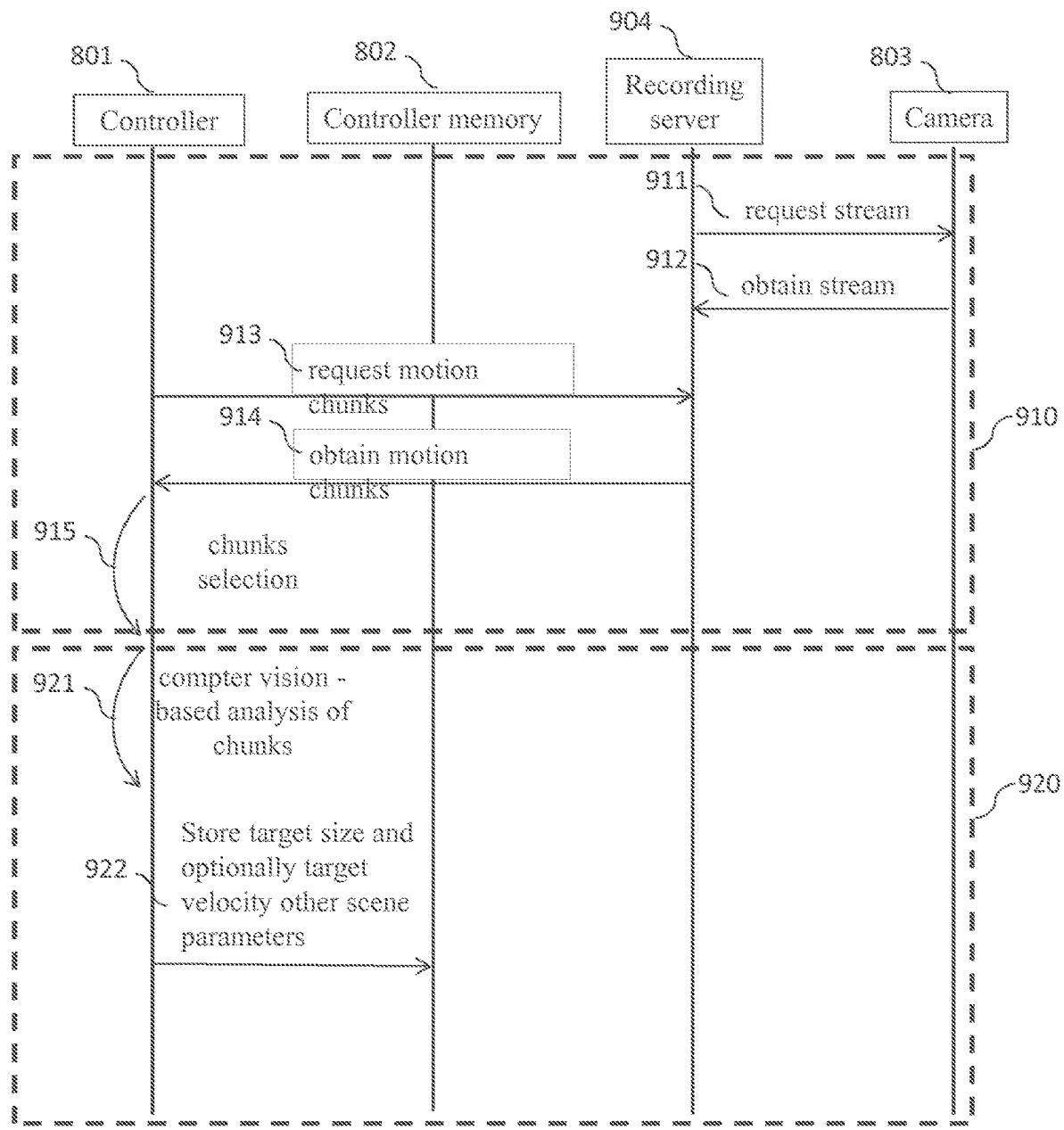

FIGS. 8 and 9 are sequence diagrams illustrating an example of steps carried out during a calibration phase of an auto-setting method as illustrated in FIG. 3.

Step 810 corresponds to the recording of images generated with different camera parameters, e.g., different values of gain and shutter speed, and comprises steps 811 to 817.

In step 811, controller 801 requests to camera 803 the minimal and maximal values of gain, shutter speed, and aperture it supports. Upon reception of request 811, the camera transmits its upper and lower bounds of gain, shutter speed, and aperture to the controller. Based on the obtained bounds of gain, shutter speed, and aperture, the controller determines intermediate values of gain, shutter speed, and aperture (step 813). An example of method for determining intermediate values of gain, shutter speed, and aperture is described at step 400 in FIG. 4. The different triplets of (G, S, A) values form a manifold. In a variant, the camera transmits triplets of (G, S, A) values to the controller that selects at least a subset of the obtained triplets of (G, S, A) values to form a manifold.

In step 814, the controller requests reception of a video stream to the camera. Upon reception of request 814, the camera starts transmission of a video stream.

In step 816, the controller selects a triplet of (G, S, A) values of the manifold and sets the gain, shutter speed, and aperture parameters of the camera with the selected triplet of values.

The controller analyses the received stream and detects a modification of the image parameters. The analysis may be launched after a predetermined amount of time or when detecting that characteristics of the obtained images are rather fixed, since the modification of gain, shutter speed, and aperture values may temporary lead to a generation of images with variable/changing characteristics. For a given triplet of (G, S, A) values, N images are recorded and stored in the controller memory 802 (step 817). The recording of N images (with N>1) is useful for computing noise.

Steps 816 and 817 are carried out for each triplet (G, S, A) of the manifold determined at step 813. Steps 816 and 817 are similar to step 405 in FIG. 4.

Step 820 is an analysis of the stored images, and comprises steps 821, 822 and 823.

In step 821, the controller retrieves, for a given triplet of values (G, S, A), the associated images stored in the controller memory, and an image metric is measured for all the obtained images (e.g., the luminance) (step 822). The measurement of the luminance aims at determining a relation between the luminance of an image and the camera settings used when obtaining this image, for example a gain, a shutter speed, and an aperture value. For each obtained image, the luminance is computed and associated with the corresponding gain, shutter speed, and aperture values so as to determine the corresponding function or to build a 3-dimensional array wherein a luminance is associated with a triplet of gain, shutter speed, and aperture values (denoted $I_{cal}(G, S, A)$). According to embodiments, the luminance corresponds to the mean of pixel values (i.e. intensity values) of the image.

According to embodiments, the entropy of the images is also computed during measurement of the luminance for making it possible to determine a contrast value during the image quality analysis. Like the luminance, the entropy is computed for each of the obtained images and associated with the corresponding gain, shutter speed, and aperture values so as to determine the corresponding function or to build a 3-dimensional array wherein an entropy is associated with a pair of gain and shutter speed values (denoted $E_{cal}(G, S, A)$).

According to embodiments, image quality parameter values are also computed, for example values of noise from the images obtained at step 821, in order to establish a relationship between each of these parameters and the camera settings used for obtaining the corresponding images (similarly to step 415 in FIG. 4).

Then, the image metrics (e.g., luminance and entropy values) and the image quality parameter values of the given (G, S, A) values are stored in the controller memory (step 823). Steps 821 to 823 are applied to each triplet (G, S, A) of values of the manifold.

FIG. 9 is a sequence diagram illustrating an example of steps carried out during a calibration phase of an auto-setting method as illustrated in FIG. 3, and may be applied following the method of FIG. 8.

Step 910 is a chunk retrieval method, and comprises steps 911 to 915.

In step 911, recording server 904 requests a video stream to the camera. Upon reception of request 911, the video stream is transmitted to the recording server (step 912). The recording server may apply basic image analysis technics, such as image motion detection, and stores the relevant parts of the video streams (named "chunks"), e.g. parts of video streams with moving targets.

In step 913, controller 801 requests chunks to the recording server. Upon reception of request 913, the recording server transmits chunks previously stored to the controller. This step is similar to step 420 in FIG. 4.

In a variant, the camera may apply basic image analysis technics, and at step 911', the controller directly requests chunks to the camera. Upon reception of request 911' from the controller, the camera transmits chunks to the controller.

In step 915, chunks are selected and analysed (step 920) by applying computer vision-based technics (step 921), thereby determining scene-dependent parameters values (i.e., related to target size and optionally to target velocity). This step is similar to step 430 in FIG. 4.

Finally, the determined scene-dependent parameters values are stored in the controller memory (step 922).

Figure 10:
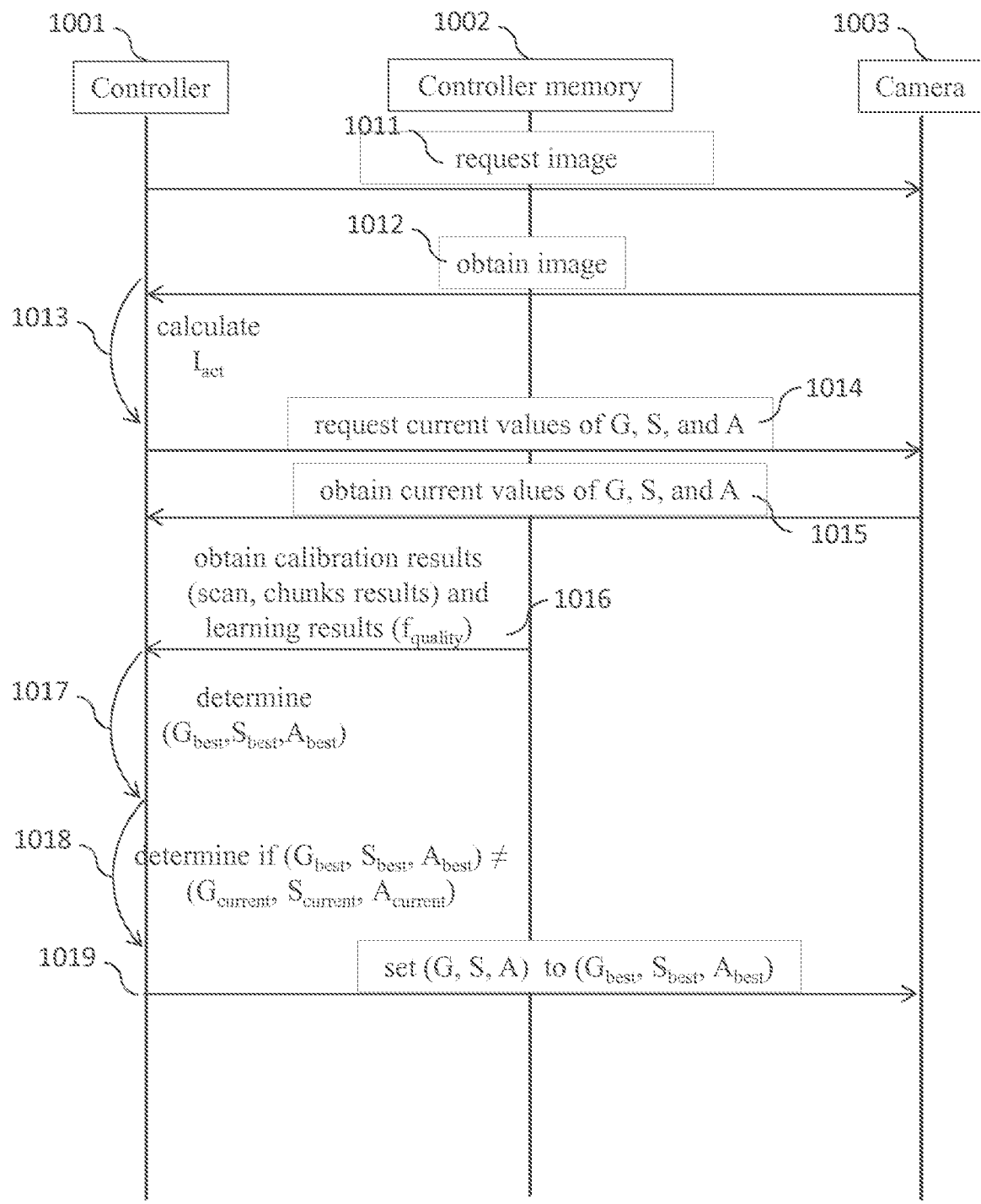
FIG. 10 is a sequence diagram illustrating an example of steps carried out during an operation phase of an auto-setting method as illustrated in FIG. 3.

FIG. 10 is a sequence diagram illustrating an example of steps carried out during an operation phase of an auto-setting method as illustrated in FIG. 3.

In step 1011, the controller requests an image to the camera. Upon reception of request 1011, the camera transmits an image to the controller. Then, the controller determines the current luminance value $I_{act}$ of the obtained image.

In step 1014, the controller requests to the camera its current camera settings ($G_{act}$, $I_{act}$), which are transmitted to the controller at step 1015. These steps are similar to steps 600 and 605 in FIGS. 6a and 6b.

In step 1016, the controller obtains the relationships between the contrast and the camera settings for the calibration environmental conditions ($contrast_{cal}(G, S, A)$), between the contrast and the luminance (contrast(I)), and between the luminance and the camera settings for the calibration environmental conditions ($I_{cal}(G, S, A)$). In parallel, before, or after, the quality function ($f_{quality}$), the relationships between the noise and the camera settings for the calibration environmental conditions ($noise_{cal}(G, S, A)$), the relationships between the blur and the camera settings for the calibration environmental conditions ($blur_{cal}(G, S, A)$), and the scene-dependent parameter values, e.g. the target size and preferably the target velocity, are obtained. This step is similar to steps 615 and 625 in FIG. 6a.

At step 1017, based on the relationships obtained at step 1016, a triplet ($G_{best}$, $S_{best}$, $A_{best}$) of "best" values are determined, and optionally, at step 1018, it is determined if it is different from the current camera settings ($G_{act}$, $S_{act}$, $A_{act}$). If true, the controller sets the camera parameters with the "best" values (step 1019).

In a variant, at step 1014, the controller requests the current camera settings ($G_{act}$, $S_{act}$, $A_{act}$) to the controller memory, which are transmitted to the controller at step 1015. Then, steps 1016 to 1019 are applied, and the couple ($G_{best}$, $S_{best}$, $A_{act}$) of "best" values is stored in the controller memory.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

APPENDIX

TABLE 1 relationships between the noise and the gain

| Gain | $G_0$ | $G_1$ | $G_2$ | ... | $G_n$ |
|---|---|---|---|---|---|
| Noise | $noise_{current}(G_0)$ | $noise_{current}(G_1)$ | $noise_{current}(G_2)$ | ... | $noise_{current}(G_n)$ |

TABLE 2 relationships between the blur and the shutter speed (motion blur) and the aperture (focus blur)

| Shutter speed/aperture | $S_0$ | $S_1$ | ... $S_n$ |
|---|---|---|---|
| $A_0$ | $blur_{current}(S_0, A_0)$ | $blurcurrent(S_1, A_0)$ | ... $blurcurrent(S_n, A_0)$ |
| $A_1$ | $blur_{current}(S_0, A_1)$ | $blurcurrent(S_1, A_1)$ | ... $blurcurrent(S_n, A_1)$ |
| ... | ... | ... | |
| $A_n$ | $blur_{current}(S_0, A_n)$ | $blurcurrent(S_1, A_n)$ | ... $blurcurrent(S_n, A_n)$ |

The invention claimed is:

1. A method of controlling setting for a camera, the method comprising:
   learning a first function representing a relationship between a plurality of image characteristic values and camera parameter values including a gain value and a shutter speed value at a first lighting condition, wherein the plurality of image characteristic values include at least one of a noise value, a blur value and a contrast value;
   calibrating a second function by adapting the first function to a second lighting condition based on a plurality of image characteristic values at the second lighting condition and the first function;
   selecting camera parameter values for the second lighting condition based on the calibrated second function; and
   setting the camera according to the selected camera parameter values.

2. The method of claim 1, wherein the first function is learned in accordance with image characteristic values included in the plurality of image characteristic values corresponding to change of at least one of the camera parameter values.

3. The method of claim 1, wherein the first function is a function for calculating a quality value of an image captured by the camera at the first lighting condition, and the second function is a function for calculating a quality value of an image captured by the camera at the second lighting condition different from the first lighting condition.

4. The method of claim 3, wherein the camera parameter values are selected based on the quality value obtained by the second function.

5. The method of claim 1, wherein the first function and the second function are learned in accordance with a mission chosen by a user.

6. The method of claim 5, wherein the mission is represented by a scene-dependent parameter containing a target size and a target velocity.

7. The method of claim 1, wherein the calibrating comprises determining relationships between at least one of the plurality of image characteristic values and at least one of the camera parameter values.

8. The method of claim 1, wherein the calibrating comprises determining relationships between conditions and at least one of the camera parameter values.

9. The method of claim 8, wherein the determining comprises determining relationships between the first lighting condition and the second lighting condition as a function of at least one of the camera parameter values.

10. A non-transitory computer-readable storage medium storing instructions of a computer program for implementing the method according to claim 1.

11. A device for controlling setting for a camera, the device comprising a microprocessor configured for carrying out the steps of:
  learning a first function representing a relationship between a plurality of image characteristic values and camera parameter values including a gain value and a shutter speed value at a first lighting condition, wherein the plurality of image characteristic values include at least one of a noise value, a blur value and a contrast value;
  calibrating a second function by adapting the first function to a second lighting condition based on the plurality of image characteristic values at the second lighting condition and the first function;
  selecting camera parameter values for the second lighting condition based on the calibrated second function; and
  setting the camera according to the selected camera parameter values.

* * * * *